United States Patent
Vaia et al.

(10) Patent No.: US 11,383,298 B1
(45) Date of Patent: Jul. 12, 2022

(54) POLARITY INVERSION OF GOLD NANOROD MATERIALS

(71) Applicant: Government of the United States, as represented by the Secretary of the Air Force, Wright-Patterson AFB, OH (US)

(72) Inventors: Richard A. Vaia, Beavercreek, OH (US); Kyoungweon Park, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/991,103

(22) Filed: Aug. 12, 2020

Related U.S. Application Data

(63) Continuation-in-part of application No. 16/220,773, filed on Dec. 14, 2018, now abandoned.

(60) Provisional application No. 62/773,465, filed on Nov. 30, 2018.

(51) Int. Cl.
| | |
|---|---|
| *B22F 1/0545* | (2022.01) |
| *B22F 1/16* | (2022.01) |
| *B22F 1/102* | (2022.01) |
| *B82Y 30/00* | (2011.01) |
| *B82Y 40/00* | (2011.01) |
| *B22F 1/145* | (2022.01) |

(52) U.S. Cl.
CPC ............ *B22F 1/0545* (2022.01); *B22F 1/102* (2022.01); *B22F 1/16* (2022.01); *B22F 1/147* (2022.01); *B22F 2301/255* (2013.01); *B22F 2998/10* (2013.01); *B22F 2999/00* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 2002/0189402 A1* | 12/2002 | Ito ........................ | B22F 1/0022 75/363 |
| 2005/0165120 A1 | 7/2005 | Kumar et al. | |
| 2012/0244225 A1 | 9/2012 | Otsuka et al. | |
| 2015/0038578 A1 | 2/2015 | Nikoobakht | |

OTHER PUBLICATIONS

Smirnov (Smirnov, Self-assembly and redox induced phase transfer of gold nanoparticles at a water-propylene carbonate interface, Chem. Commun., 2017, 53, p. 4108-4111) (Year: 2017).*

Kittler et al., Easy and Fast Phase Transfer of CTAB Stabilized Gold Nanoparticles from Water to Organic Phase, Jan. 2015, Z. Phys. Chem., 229(1-2), 235-245 (Year: 2015).*

Abate, Nanometer-scale size dependent imaging of cetyl trimethyl ammonium bromide (CTAB) capped and uncapped gold nanoparticles by apertureless near-field optical microscopy, Chemical Physics Letters 474 (2009), p. 146-152 (Year: 2009).*

Gadogbe, Determination of colloidal gold nanoparticle surface areas, concentrations, and sizes through quantitative ligand adsorption, Anal Bioanal Chem, 2013, 405, p. 413-422 and Supplementary Material p. 1-3 (Year: 2013).*

Zhu, Effect of alkyl chain length on phase transfer of surfactant capped Au nanoparticles across the water/toluene interface, Colloids and Surfaces A: Physicochemical and Engineering Aspects, vol. 256, Issue 1, Apr. 1, 2005, p. 17-20 (Year: 2005).*

Smirnov, Self-assembly and redox induced phase transfer of gold nanoparticles at a water-propylene carbonate interface, Chem. Commun., 2017, 53, p. 4108-4111 (Year: 2017).*

Zhu, H. et al., Effect of alkyl chain length on phase transfer of surfactant capped Au nanoparticles across the water/toluene interface, Colloids and Surfaces A: Physicochem. Eng. Aspects 256 (2005) 17-20.

Abate, Y., et al., Nanon1eter-scale size dependent imaging of cetyl trimethyl ammonium bromide (CTAB) capped and uncapped gold nanoparticles by apertureless near-field optical microscopy, Chemical Physics Letters 474 (2009) 146-152.

Ranoszek-Soliwoda, K., et al., Versatile Phase Transfer Method for the Efficient Surface Functionalization of Gold Nanoparticles: Towards Controlled Nanoparticle Dispersion in a Polymer Matrix, Journal of Nanomaterials vol. 2016, Article ID 9058323, http://dx.doi.org/10.1155/2016/9058323.

Gadogbe, M. et al., Determination of colloidal gold nanoparticle surface areas, concentrations, and sizes through quantitative ligand adsorption, Anal Bioanal Chem (2013) 405:413-422.

(Continued)

*Primary Examiner* — Tabatha L Penny
(74) *Attorney, Agent, or Firm* — AFMCLO/JAZ; Timothy M. Barlow

(57) ABSTRACT

A method for preparing an anhydrous nanoparticle dispersion, comprising providing an aqueous medium comprising a surfactant and a quantity of surfactant-coated nanoparticles suspended in the aqueous medium; (i.) estimating an average particle length and an average particle diameter of the surfactant-coated nanoparticles suspended in the aqueous medium, and estimating a quantity of the surfactant-coated nanoparticles in the aqueous medium; estimating a surface area (SA) of the surfactant-coated nanoparticles in the aqueous medium based on the average particle length and the average particle diameter and the quantity of the surfactant-coated nanoparticles; adjusting a ratio of the quantity of the surfactant-coated nanoparticles to a quantity of the surfactant to a desired value to form a precursor aqueous solution; diluting the precursor aqueous solution with an organic solvent to provide a suspension of surfactant-coated nanoparticles in the solvent, and heating the suspension at about 100° C. for about 20 min to remove remaining water.

15 Claims, 26 Drawing Sheets
(21 of 26 Drawing Sheet(s) Filed in Color)

(56) References Cited

OTHER PUBLICATIONS

Applied Sciences "Aqueous-Organic Phase Transfer of Gold and Silver Nanoparticles Using Thiol-Modified Oleic Acid", Mar. 9, 2017 by Alejandra López-Millán, Paul Zavala-Rivera, Reynaldo Esquivel, Roberto Carrillo, Enrique Alvarez-Ramos, Ramón Moreno-Corral, Roberto Guzmán-Zamudio and Armando Lucero-Acuña*.
Langmuir, "A General Method for Solvent Exchange of Plasmonic Nanoparticles and Self-Assembly into SERS-Active Monolayers" Aug. 10, 2010 Ana B. Serrano-Montes, Dorleta Jimenez de Aberasturi, Judith Langer, Juan J. Giner-Casares, Leonardo Scarabelli, Ada Herrero, and Luis M. Liz-Marzán.
JACS Communications, "Aqueous-Organic Phase Transfer of Gold Nanoparticles and Gold Nanorods Using an Ionic Liquid" Apr. 1, 2004 Guor-Tzo Wei, Zusing Yang, Chia-Ying Lee, Hsiao-Yen Yang, and C. R. Chris Wang Department of Chemistry and Biochemistry, National Chung Cheng University, San-Hsing, Ming-Hsiung.
Z. Phys. Chem. 2015; 229(1-2): 235-245, "Easy and Fast Phase Transfer of CTAB Stabilised Gold Nanoparticles from Water to Organic Phase" Susann Kittler, Stephen G. Hickey, Thomas Wolff, and Alexander Eychmüller.
Gadogbe, M., Determination of colloidal gold nanoparticle surface areas, concentrations and sizes through quantitative ligand absorption, Anal. Bioanal. Chem. 2013, 405, pp. 413-422.
Zhu, H., Effect of alkyl chain length on phase transfer of surfactant capped Au nanoparticles across the water/toluene interface, Colloids and Surfaces A: Physicochem. Eng. Aspects 256 (2005) 17-20.
Abate, Y., Nanometer-scale size dependent imaging of cetyltrimethyl ammonium bromide (CTAB) capped and uncapped gold nanoparticles by apertureless near-field optical microscopy, Chemical Physics Letters 474 (2009) 146-152.
Sperling, R.A., Surface modification, functionalization and bioconjugation of colloidal inorganic nanoparticles, Phil. Trans. R. Soc. A (2010) 368, 1333-1383.
Ranoszek-Soliwoda, K., Versatile Phase Transfer Method for the Efficient Surface Functionalization of Gold Nanoparticles: Towards Controlled Nanoparticle Dispersion in a Polymer Matrix, Journal of Nanomaterials, vol. 2016, Article ID 9058323.
Lopez-Millan, A., Aqueous-Organic Phase Transfer of Gold and Silver Nanoparticles Using Thiol-Modified Oleic Acid, Appl. Sci. 2017, 7,2 73.
Serrano-Montes, A., A General Method for Solvent Exchange of Plasmonic Nanopartides and Self-Assembly into SERS-Active Monolayers, Langmuir 2015, 9205-9213.
Kittler, S., Easy and fast Phase Transfer of CTAB Stabilised Gold Nanoparticles from Water to Organic Phase, Z. Phys. Chem. 2015; 229 (1-2): 235-245.
Wei, G-T, Aqueous, Organic Phase Transfer of Gold Nanoparticles and Gold Nanorods Using an Ionic Liquid, J. Am. Chem. Soc., vol. 126, No. 16, 2004.

* cited by examiner

POLARITY INVERSION OF GOLD NANOROD MATERIALS

CROSS REFERENCE TO RELATED APPLICATIONS

Pursuant to 37 C.F.R. § 1.78(a)(4), this application claims the benefit of and priority to prior-filed Provisional Application Ser. No. 62/773,465 filed 30 Nov. 2018, and U.S. patent application Ser. No. 16/220,773 filed 14 Dec. 2018, which are expressly incorporated by reference.

GOVERNMENT INTEREST

The invention described herein may be manufactured and used by or for the Government of the United States for all governmental purposes without the payment of any royalty.

FIELD OF THE INVENTION

This invention is directed to nanomaterials, and more particularly to a method for modifying physical properties of gold nanorods.

BACKGROUND OF THE INVENTION

Nanoparticles made of metals, semiconductors, or oxides are of interest for their mechanical, electrical, magnetic, optical, chemical, and other properties. Gold nanoparticles are widely used classes of nanomaterials for chemical, bioanalytical, biomedical, electronics, optical, and nanotechnological applications.

Synthesis of nanoparticles is typically performed in an aqueous environment with an excess of a surfactant. It is desired to be able to transfer surfactant coated nanoparticles from an aqueous medium to an organic solvent medium to enable their use for a variety of different applications. However, conventional methods for transferring nanoparticles from an aqueous medium to an organic solvent medium often have poor or undesirable results and may alter optical and physical properties of the nanoparticles rendering them unsuitable for their intended purpose. In this regard, improvement is desired in the preparation of surfactant-coated nanoparticles for transfer from an aqueous medium to an organic solvent medium.

Nanoparticles are integral to a broad range of technologies, from displays and multifunctional coatings, to biomedical sensors and image contrast agents. Nominally, their cost is not associated with their reactants, but with an excessively small product-to-reagent ratio, and inefficiencies during purification and post-fabrication modification. For example, colloidal gold nanorods (AuNRs) have been one of the most attractive plasmonic nanoparticles for decades due to their extremely strong opto-electronic properties and associated structural tunability (aspect ratio, volume, composition). Limitations arise not from the cost of gold, but from a 1000-fold excess of stabilizing ligands, nano-molar concentration of product, multi-step purification, and incomplete surface functionalization due to a partial solubility of desired reagents in water. Most synthetic routes for AuNRs require cetyltrimethylammonium bromide (CTAB) concentrations that are two orders of magnitude higher than the critical micelle concentration (CMC~1 mM). The resulting CTAB bilayer on the AuNR surface provides electrostatic stability in water; however, the dense assembly of the hydrophilic ammonium head groups challenge transfer and dispersion of AuNRs in nonaqueous solvents.

For post-synthesis modifications, the CTAB bilayer is conventionally exchanged with molecules, oligomers, or polymers that possess both a higher affinity to the AuNR surface and good solubility in the intended organic solvent. For example, thiol-terminal polyethylene glycol (PEG) is often used as the phase transfer agent. However due to the strong, site-specific binding of CTAB to the AuNR surface, multiple steps that include centrifugation and excess ligand addition are required to prevent irreversible aggregation. Direct modification with hydrophobic polymers, such as thiol-terminal polystyrene, is even more inefficient. In addition to increased time and reagent use, repeated sedimentation-dispersion leads to nanoparticle loss. Alternative functionalization strategies that do not remove CTAB have been developed, such as oxide (e.g. $SiO_2$) shell formation and polyelectrolyte wrapping.

These surrounding canopies are even more strongly associated with the nanoparticle, and significantly restrict subsequent surface conjugation chemistries meant to maximize direct plasmon coupling or hot-electron capture at the AuNR surface. Therefore, the ability to maintain dispersion in a wide range of solvents via a weakly coordinated surfactant would greatly increase the efficiency and flexibility of nanoparticle modification. Such a universal stabilizing motif, i.e. an alchemical alkahest canopy, would simplify the synthetic tuning of physiochemical properties.

Herein, we demonstrate that a CTAB ligand shell can function as an alkahest canopy, enabling phase transfer and stabilization of AuNRs in both water and organic solvents.

Conceptually, surfactants, such as CTAB, exhibit concentration (and temperature) dependent equilibrium between molecular species in solution and various meso-structures, such as spherical and wormlike micelles or surface-absorbed bilayers. The dynamic character of these mesostructures and ability to undergo inversion depends on their defect concentration, which increases as the concentration-dependent phase-boundaries between various mesostructures are approached. By tuning the CTAB concentration below the CMC, but slightly higher than irreversible nanoparticle aggregation, AuNRs are not only stable in water, but also form stable dispersions in aprotic polar solvents, such as acetone, THF, propylene carbonate (PC), NMP, DMF, and DMSO, as well as multi-component organic mixtures containing nonpolar solvents, such as chloroform, toluene, cyclohexane, and hexane. The utility of this broad range of solvent dispersions is demonstrated by increasing the efficiency and expanding the approaches to AuNR surface functionalization.

What is needed, therefore, are improved methods for preparing surfactant-coated nanoparticles, and in particular gold nanoparticles, for transfer from an aqueous medium to an organic solvent medium.

SUMMARY OF THE INVENTION

The above and other needs are met by methods for preparing surfactant-coated nanoparticles for transfer from an aqueous medium to an organic solvent medium.

In one aspect, the invention relates to a method for preparing surfactant-coated gold nanoparticles for transfer from an aqueous medium to an organic solvent medium. The method includes the steps of a. providing a volume of an aqueous medium having a cetyltrimethylammonium surfactant and a quantity of surfactant-coated gold nanoparticles suspended in the aqueous medium; b. i. estimating an average particle length and an average particle diameter of the surfactant-coated gold nanoparticles suspended in the aqueous medium, and ii. estimating a quantity of the surfactant-coated gold nanoparticles in the aqueous medium; c. estimating a surface area (SA) of the surfactant-coated gold nanoparticles in the aqueous medium based on the average particle length and an average particle diameter determined in step b. i. and the quantity of the surfactant-coated gold nanoparticles estimated in step b. ii.; d. adjusting the quantity of the surfactant to a quantity of the nanoparticle surface area (CTAB/SA$_{NP}$) between 10 to 20 to form a precursor aqueous solution; and e. diluting the precursor aqueous solution with an organic solvent to provide a suspension of surfactant-coated gold nanoparticles in the organic solvent.

In another aspect, the invention relates to a method for preparing surfactant-coated nanoparticles for transfer from an aqueous medium to an organic solvent medium. The method includes the steps of a. providing a volume of an aqueous medium having a surfactant and a quantity of surfactant-coated nanoparticles suspended in the aqueous medium; b. i. estimating an average particle length and an average particle diameter of the surfactant-coated nanoparticles suspended in the aqueous medium, and ii. estimating a quantity of the surfactant-coated nanoparticles in the aqueous medium; c. estimating a surface area (SA) of the surfactant-coated nanoparticles in the aqueous medium based on the average particle length and an average particle diameter determined in step b. i. and the quantity of the surfactant-coated nanoparticles estimated in step b. ii.; d. adjusting the quantity of the surfactant-coated nanoparticles to a quantity of the surfactant to a desired value to form a precursor aqueous solution; and e. diluting the precursor aqueous solution with an organic solvent to provide a suspension of surfactant-coated nanoparticles in the organic solvent.

In a further aspect, the invention relates to a method for preparing an anhydrous nanoparticle dispersion, comprising the steps of (a) providing an aqueous medium comprising a surfactant and a quantity of surfactant-coated nanoparticles suspended in the aqueous medium; (b) (i.) estimating an average particle length and an average particle diameter of the surfactant-coated nanoparticles suspended in the aqueous medium, and (ii.) estimating a quantity of the surfactant-coated nanoparticles in the aqueous medium; (c) estimating a surface area (SA) of the surfactant-coated nanoparticles in the aqueous medium based on the average particle length and the average particle diameter determined in step (b) (i.) and the quantity of the surfactant-coated nanoparticles estimated in step (b) (ii.); (d) adjusting a ratio of the quantity of the surfactant-coated nanoparticles to a quantity of the surfactant to a desired value to form a precursor aqueous solution; (e) diluting the precursor aqueous solution with an organic solvent to provide a suspension of surfactant-coated nanoparticles in the organic solvent, and (f) heating the suspension at about 100° C. for about 20 min to remove remaining water.

In a first variation, the step of adjusting the quantity of the surfactant-coated nanoparticles to the quantity of surfactant comprises: separating the surfactant-coated nanoparticles from the surfactant to provide a supernatant component and a solid component; decanting a portion of the supernatant component to reduce the quantity of the surfactant to provide a residual mixture; and diluting the residual mixture with water to provide the precursor aqueous solution.

In a further variation, the step of adjusting a quantity of the surfactant to a desired value to form a precursor aqueous solution, comprises adjusting the quantity of the surfactant to a quantity of the nanoparticle surface area (CTAB/SA$_{NP}$) between 10 to 20. Regarding the separating step described above, a typical process is to centrifuge the solution at a desired speed and for a desired time to obtain a clear supernatant. The supernatant is then decanted to leave a highly concentrated AuNR solution. It may be helpful to remove no more than 90% of supernatant at a time so as to avoid disturbing the sedimentation. What is separated is not really a solid component. Instead, it is more like highly-concentrated particle solution which may be diluted and centrifuged repeatedly until obtaining a targeted CTAB concentration.

In another variation, the organic solvent comprises a polar aprotic solvent of boiling point higher than 200° C. The polar aprotic solvent may be one or more of n-methylpyrrolidinone and propylene carbonate, and others having similar properties.

In a further variation, the heating step (f) temperature may be between 80° C. to 120° C., and the heating time may be between 20 min to 24 hr. The nanoparticles may be gold nanoparticles, e.g. gold nanorods.

In another variation, the surfactant comprises a cetyltrimethylammonium surfactant.

In a further variation, the step of estimating surface area of the surfactant-coated nanoparticles includes estimating a concentration of the nanoparticles and a concentration of the surfactant in the aqueous medium using ultraviolet—visible spectroscopy.

In another variation, the method may include a further step (g) diluting the anhydrous nanoparticle dispersion with organic solvents to provide a suspension of surfactant-coated nanoparticles in the mixture of organic solvent. The organic solvent may be selected from any polar solvent and combinations thereof, e.g. toluene, chloroform, cyclohexane, hexane, and combinations thereof.

Each of the various aspects and variations described above may be combined in any manner to achieve the desired objectives.

Controlling the surface chemistry of nanoparticles is crucial; and affects everything from performance to synthesis, processability, and toxicity. Many times however, stability requirements during synthesis, processing, and integration are contradictory; and necessitate phase transfer methods and surface modifications that lead to waste and limit functionalization options. Herein, we demonstrate that the solvation of colloidal gold nanorods (AuNRs) can be tuned from water to aprotic organics by thermodynamically tuning the morphology of its ligand bilayer assembly (cetyltrimethylammonium bromide, CTAB)—performing as an alchemical alkahest canopy. As CTAB concentration decreases below the critical micelle concentration (CMC), the bilayer is depleted due to an equilibrium between surfactant molecules in solution and on the AuNR surface. These aqueous stable AuNRs with a depleted ligand stabilization layer directly phase transfers to aprotic polar organic solvents, afford the creation of anhydrous dispersions, and enables formulation of dispersions in non-polar organic solvents. This behavior is consistent with a structural inversion of the weakly-coordinating, defective CTAB bilayer in response to the medium's polarity. The utility of these organically stable AuNR dispersion is demonstrated by substantially increasing the effectiveness of grafting-to reactions of thiolated apolar polymers, and the formation of Au—C bonds via anhydrous Grignard surface reactions.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Other embodiments of the invention will become apparent by reference to the detailed description in conjunction with the figures, wherein elements are not to scale so as to more clearly show the details, wherein like reference numbers indicate like elements throughout the several views, and wherein.

Figure 3A:
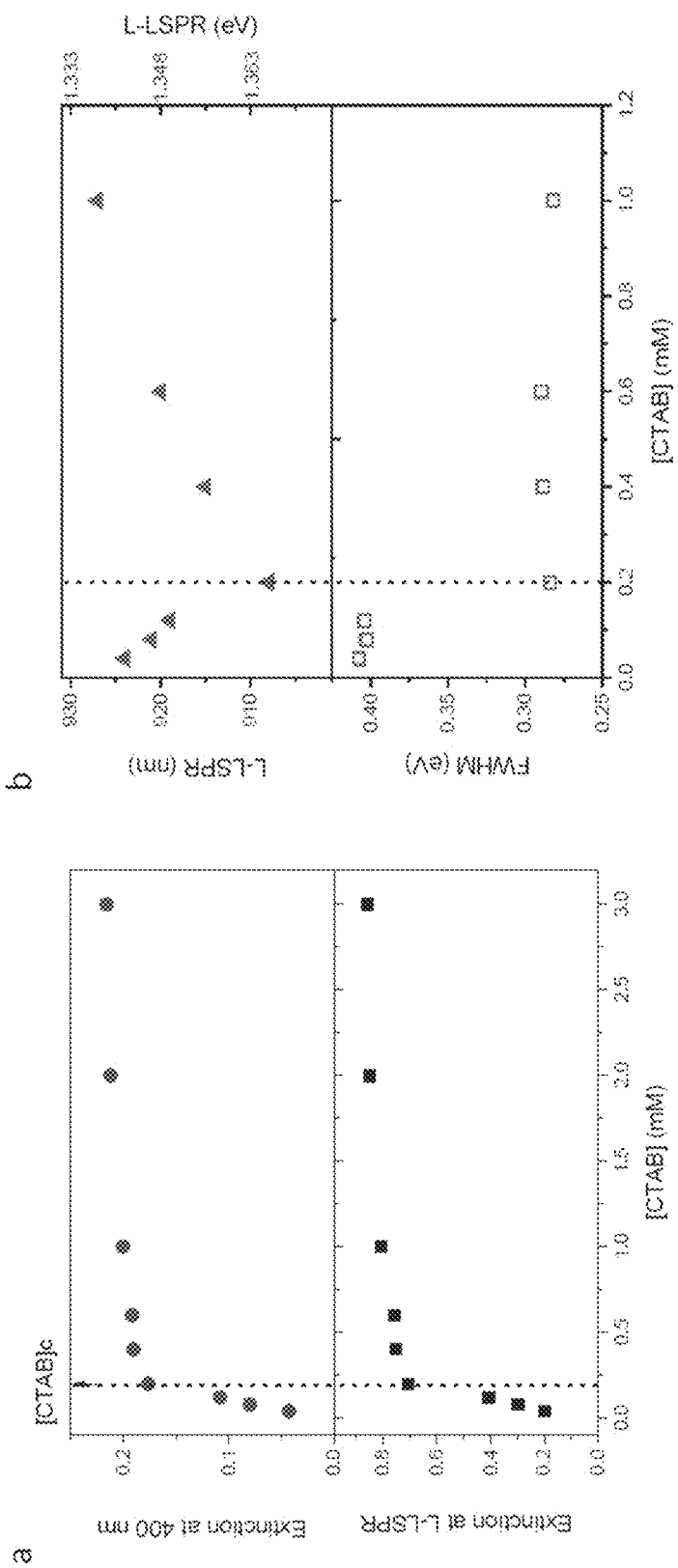
FIGS. 3A-3B depict the Impact of [CTAB] on AuNR Stability.

Image (a) of FIG. 3A depicts the change of extinction intensity at 400 nm and L-LSPR;

Image (b) of FIG. 3A depicts the change of L-LSPR peak position and FWHM, as a function of bulk CTAB concentration at fixed [AuNR]=1.8 nM (AuNR aspect ratio(AR)~5.3, 2r~12.6 nm, L~66.7 nm).

Figure 3B:
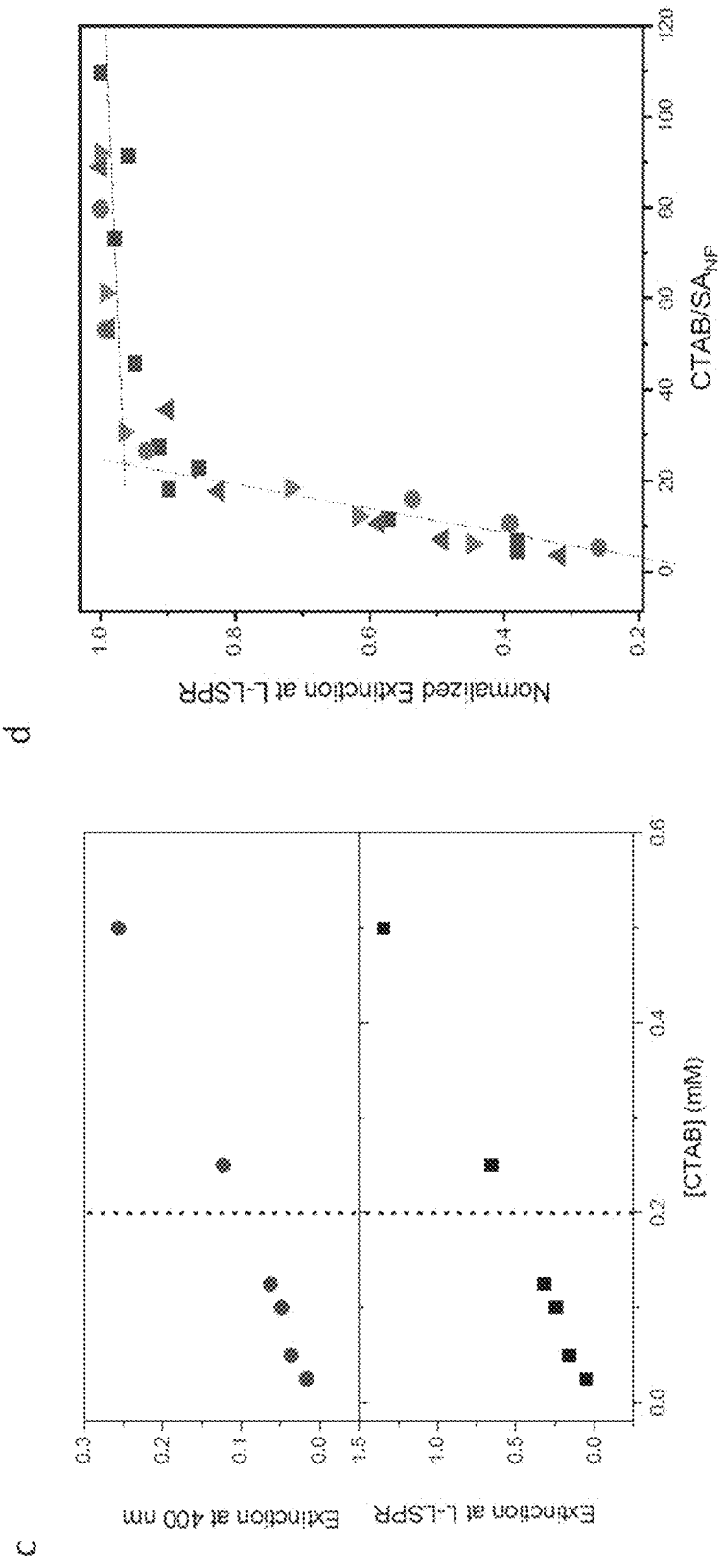

Image (c) of FIG. 3B depicts change of extinction intensity at L-LSPR and at 400 nm as a function of bulk CTAB concentration at fixed [CTAB]/[AuNR]=5×10$^4$.

Image (d) of FIG. 3B depicts change of normalized extinction intensity at L-LSPR as a function of number of CTAB per unit surface area, CTAB/SA$_{NP}$~[CTAB]/[AuNR]*(2πrl)$^{-1}$. The extinction intensities at L-LSPR are normalized to the extinction intensity at CTAB/SA$_{NP}$=1000.

Figure 4:
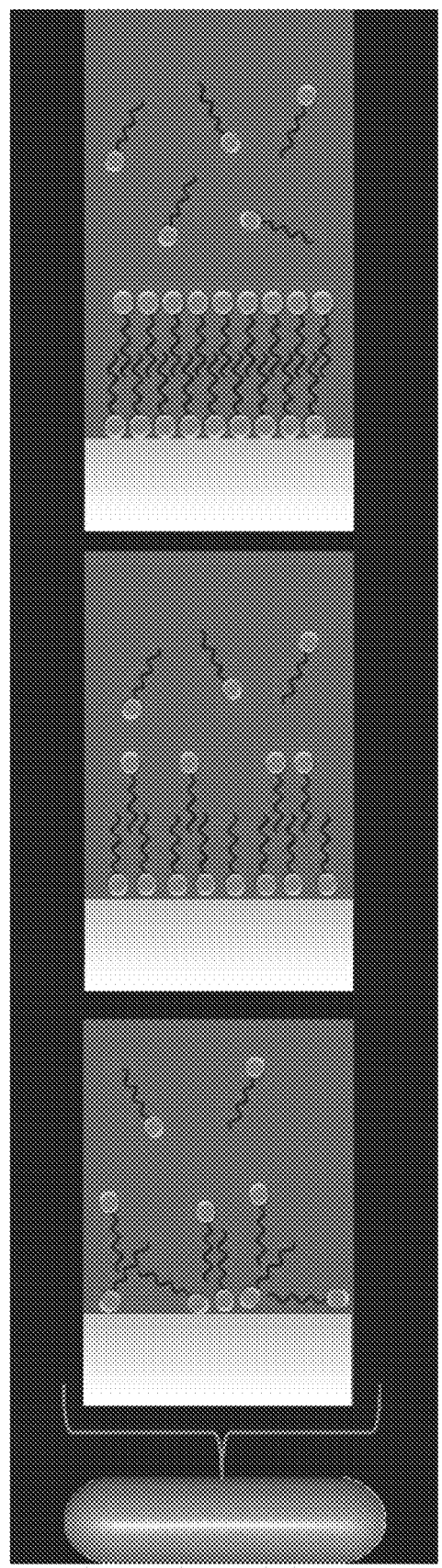

FIG. 4 depicts proposed CTAB structure on AuNR surface in H$_2$O dispersion at different CTAB/SA$_{NP}$.

Figure 5:
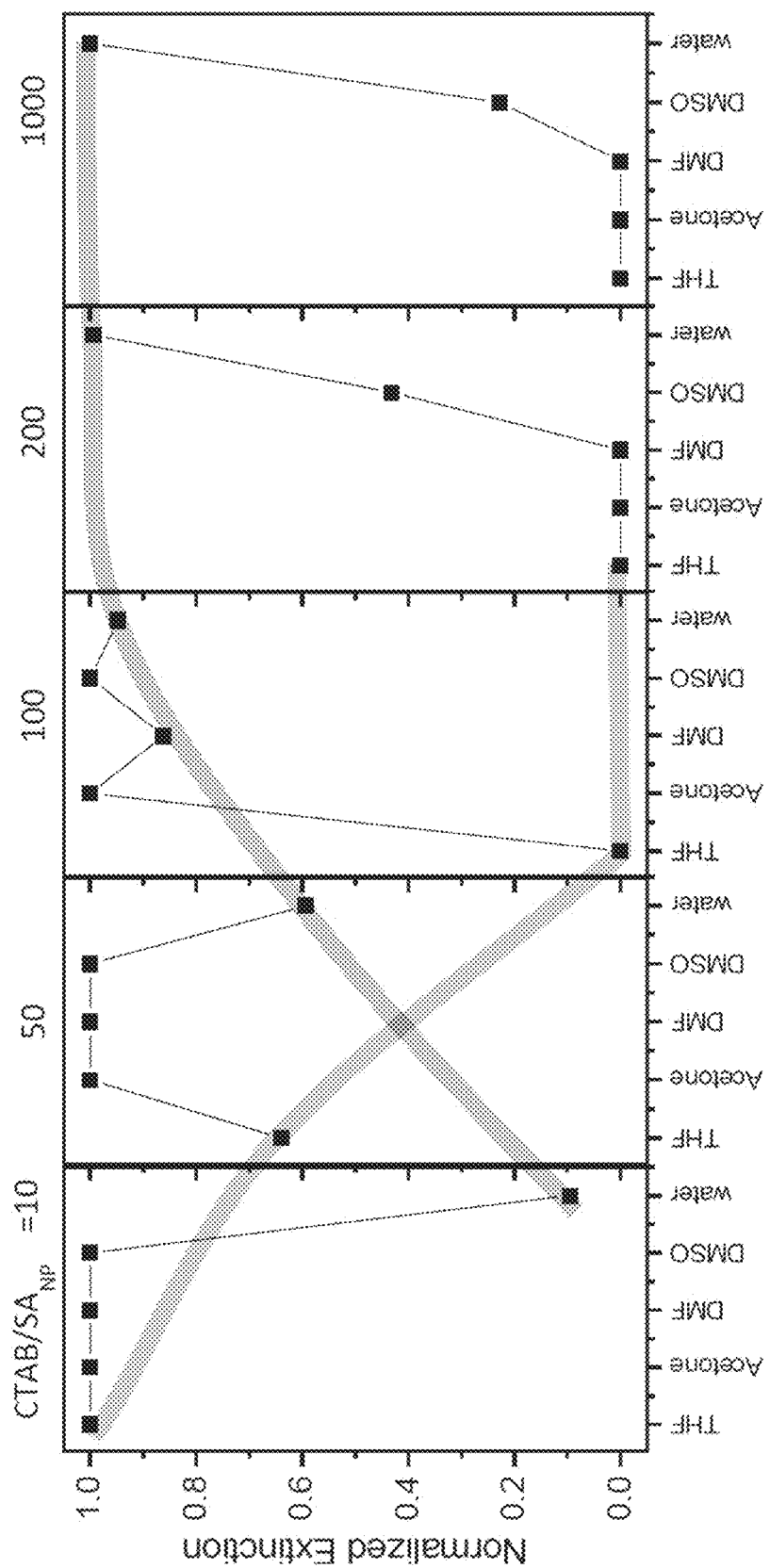

FIG. 5 depicts AuNR Dispersion in Aprotic Polar Solvents. Au NRs (AR~4.2, 2r~7.1 nm, l~29.9 nm) with different CTAB/SA$_{NP}$ (10 to 1000) were dispersed in various aprotic polar solvents (THF, acetone, DMF, DMSO, H$_2$O)—Image (a) Change in extinction intensity at L-LSPR normalized by the extinction intensity of the same [AuNR] in H$_2$O.

Figure 6:
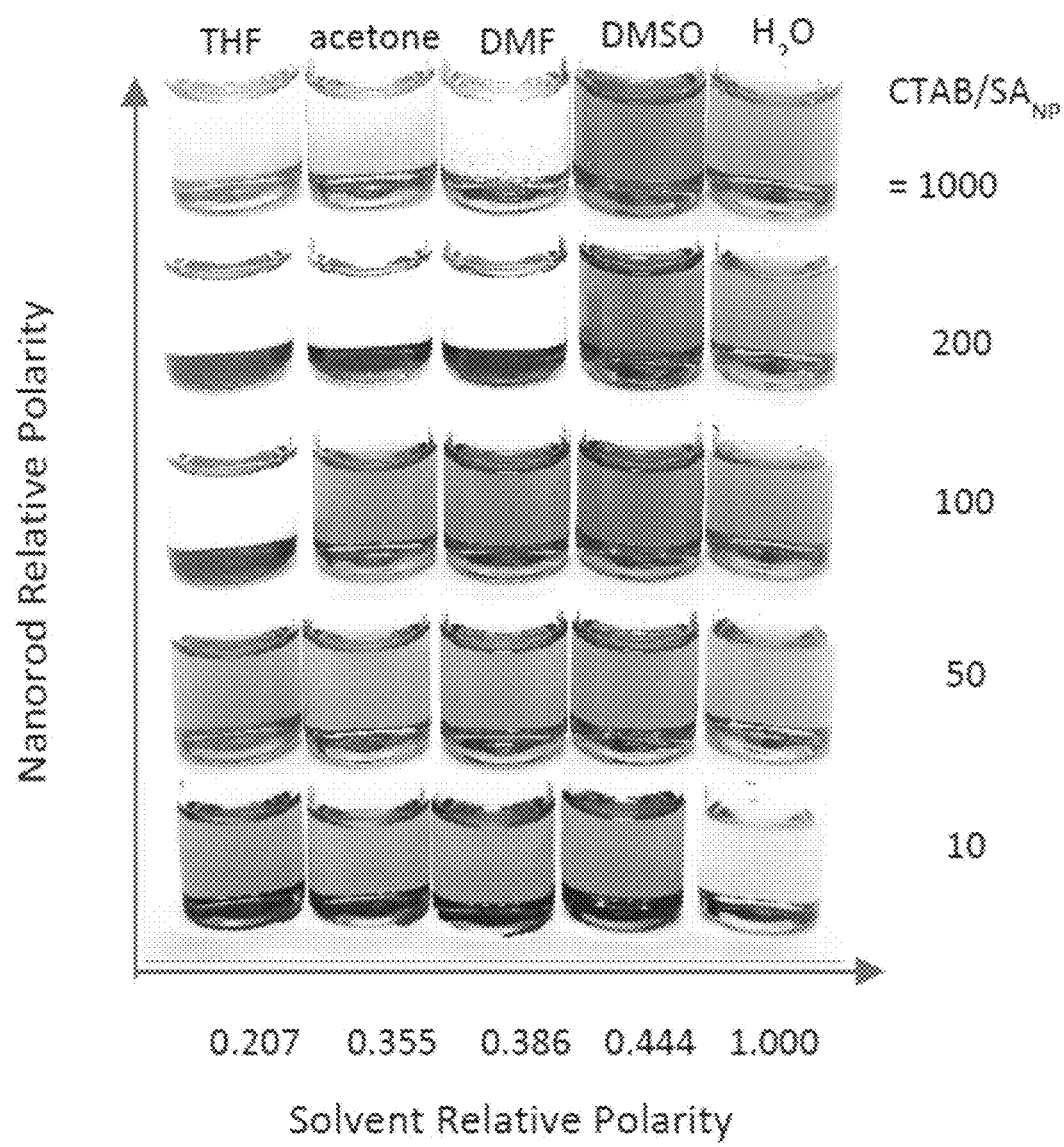

FIG. 6 depicts the color of AuNR dispersion in various solvents. They are placed in the order of THF, acetone, DMF, DMSO and H$_2$O from left to right. CTAB/SA$_{NP}$ increases from top to bottom.

Figure 7:
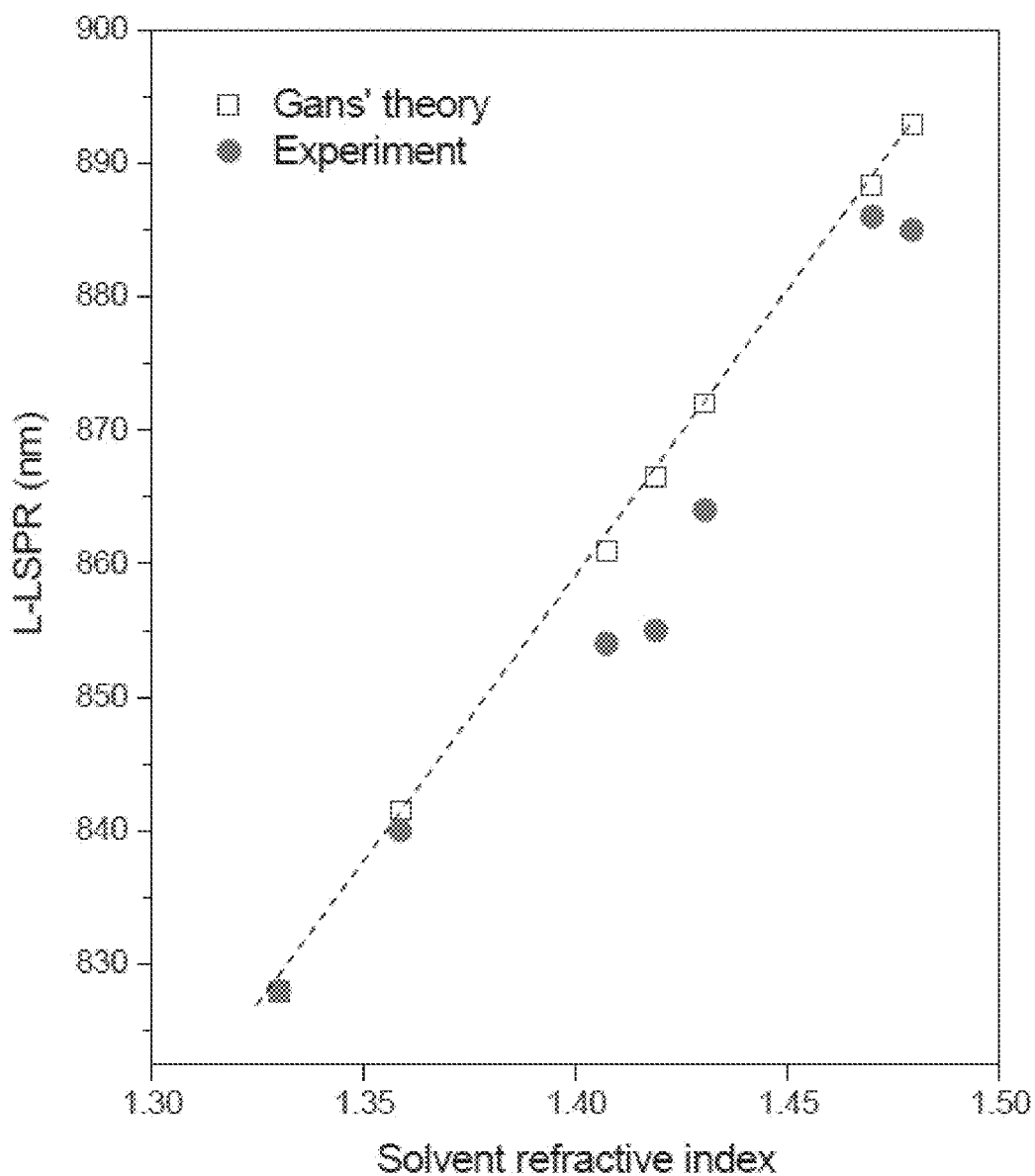

FIG. 7 depicts L-LSPR peak and refractive index of solvents plotted confirming that the red shift is due to increasing refractive index of the solvents (also see Table S4).

Figure 8:
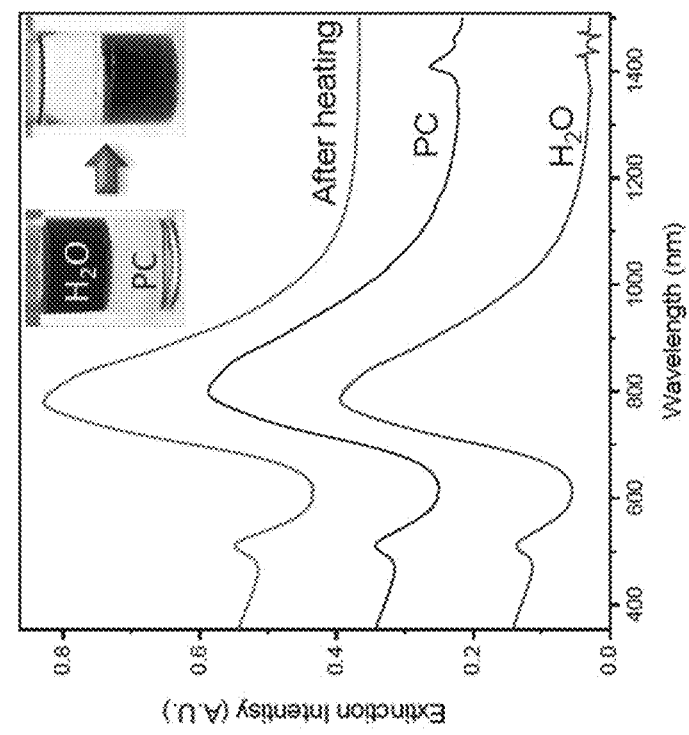

FIG. 8 depicts anhydrous AuNR dispersions: extinction spectra of AuNR (AR~4.2, 2r~7.1 nm, l~29.9 nm) dispersion with CTAB/SA$_{NP}$~10 initially in H$_2$O (bottom, the noisy signals around 1400 nm is due to residual background from H$_2$O), phase transferred to PC (middle) and after 20 min at 100° C. to remove residual H$_2$O from PC (top). Note that the spectra are nominalized to the bulk solvent.

Figure 9:
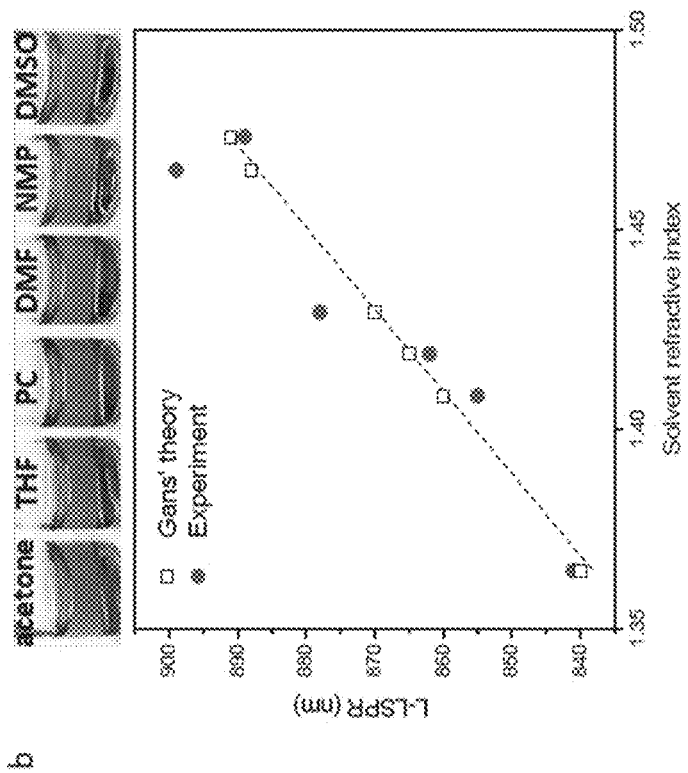

FIG. 9 depicts anhydrous dispersion of AuNRs in PC/polar solvent mixtures. The change of L-LSPR as a function of refractive index of mixed solvents agrees with Gan's theory (UV-Vis NIR spectra shown in FIG. 25).

Figure 10:
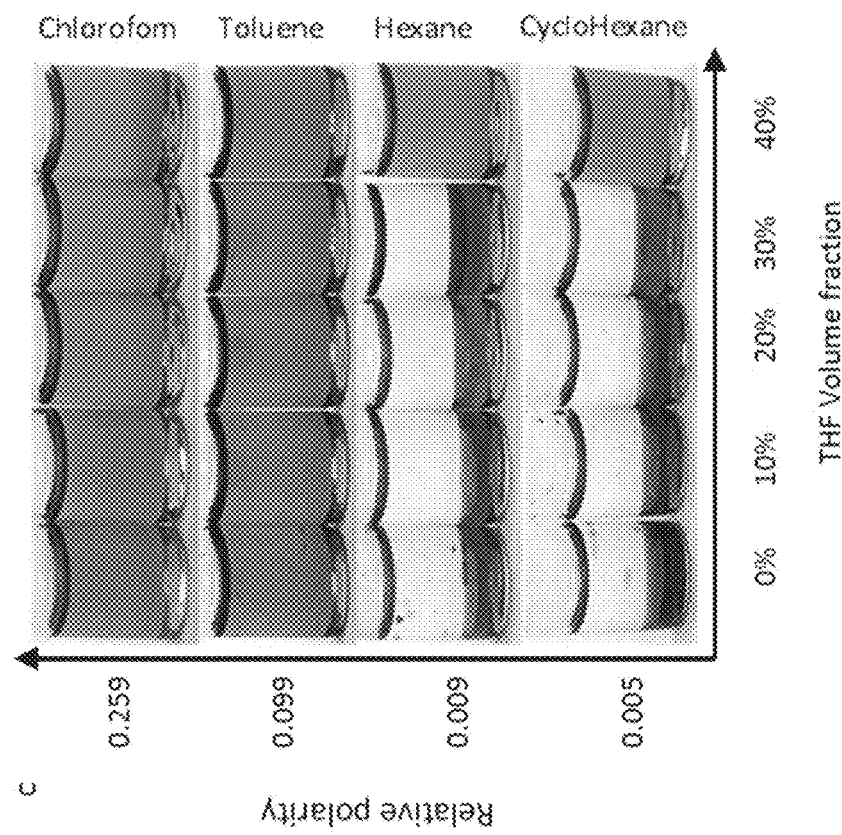

FIG. 10 depicts AuNRs dispersed in a mixture of polar and nonpolar solvents as a function of increasing THF volume fraction. The volume fraction of PC was fixed at 20%.

Figure 11:
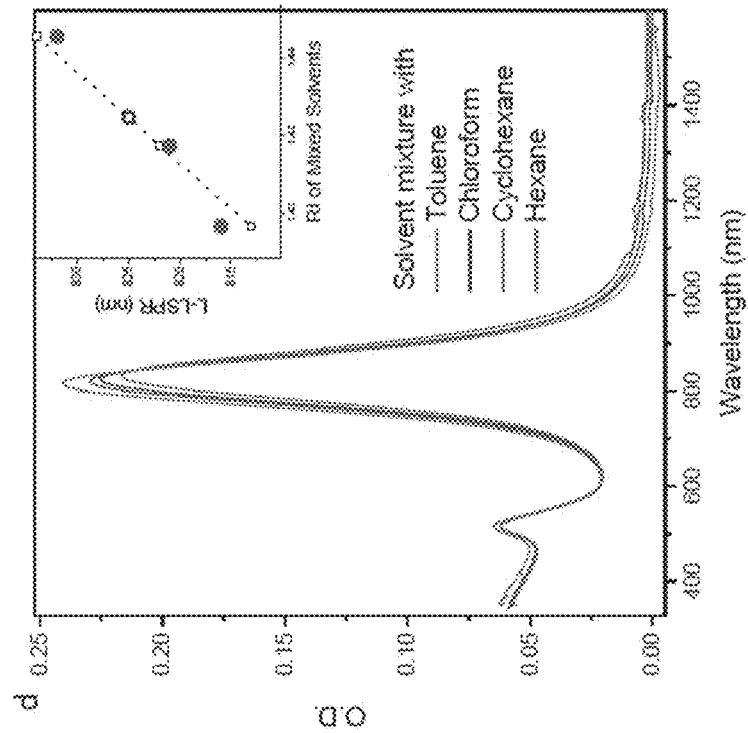

FIG. 11 depicts UV-Vis-NIR spectra of AuNRs dispersion in polar and non-polar solvent mixtures. The volume ratio of PC:THF:nonpolar was 4:4:2. The inset is the L-LSPR peak position as a function of solvent refractive index which agrees with Gans' theory. The refractive index of the solvent mixture increases in the order of hexane, cyclohexane, chloroform, and toluene (also see Table S4).

Figure 12:
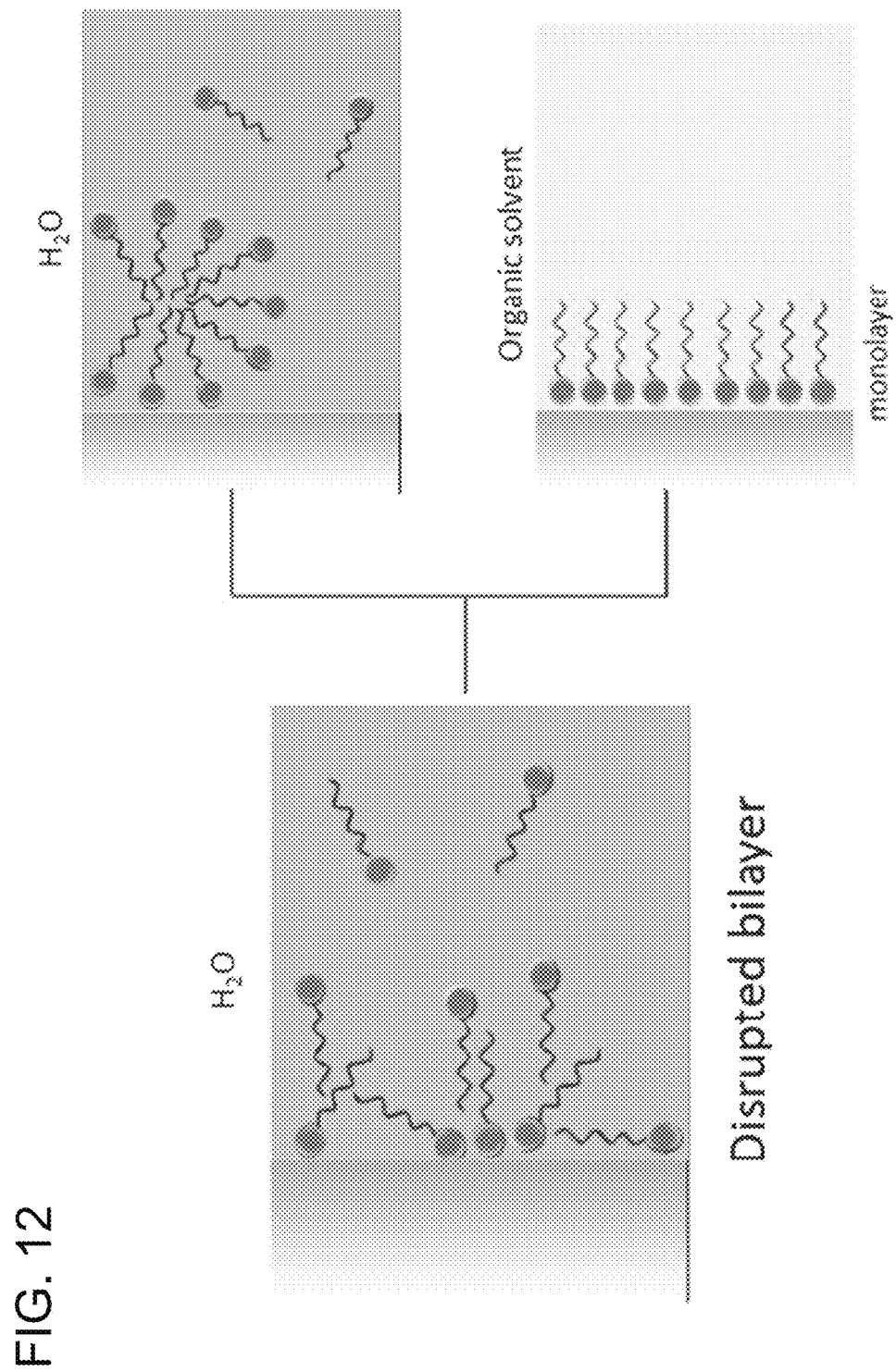

FIG. 12 depicts a proposed CTAB structure on AuNRs in aprotic polar solvents.

Figure 13:
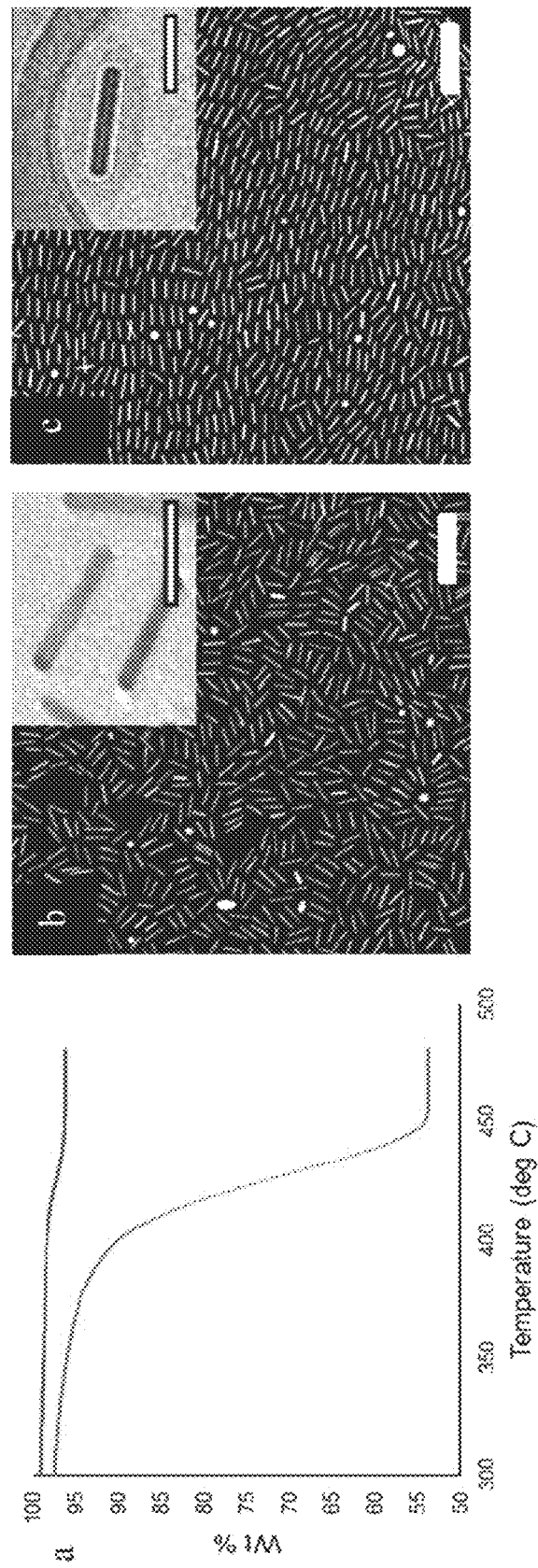

FIG. 13 depicts homogenous grafting-to of PS—SH (53 k) to AuNRs: Image (a) depicts TGA and Images (b-c) depict STEM images of PS grafted AuNRs (scale bar is 200 nm, AR=7; 1=73.7 nm; 2r=10.6 nm). The upper curve of Image (a) depicts AuNRs functionalized by conventional heterogeneous route corresponding to Image (b). The lower curve of Image (a) depicts AuNRs functionalized via homogenous reaction in THF corresponding to Image (c). The inset of Images (b) and (c) are TEM images of individual AuNR. The scale bar is 50 nm.

Figure 14:
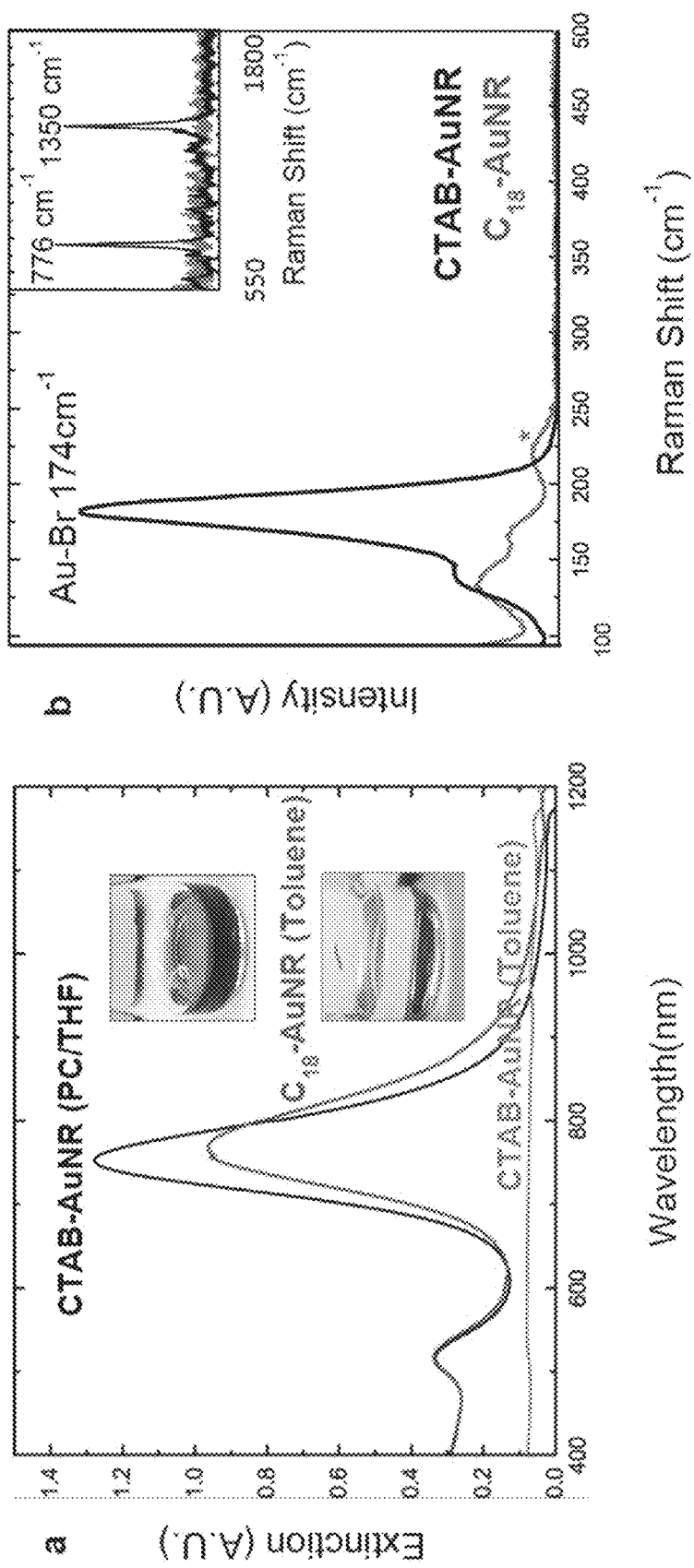

FIG. 14 depicts Grignard functionalization in anhydrous AuNR dispersions. Image (a) depicts UV-Vis-NIR extinction spectra of AuNRs dispersion before and after functionalization. The inset images show the corresponding solutions after 14 days. Image (b) depicts Raman spectroscopy of C$_{18}$ functionalized AuNRs indicating the loss of surface bound Au—Br complex and CTAB vibrations and an emergence of a new vibrational mode at c.a. 225 cm$^{-1}$. The inset shows the intensity from wavenumbers ranging from 550 to 1800 cm$^{-1}$.

Figure 15:
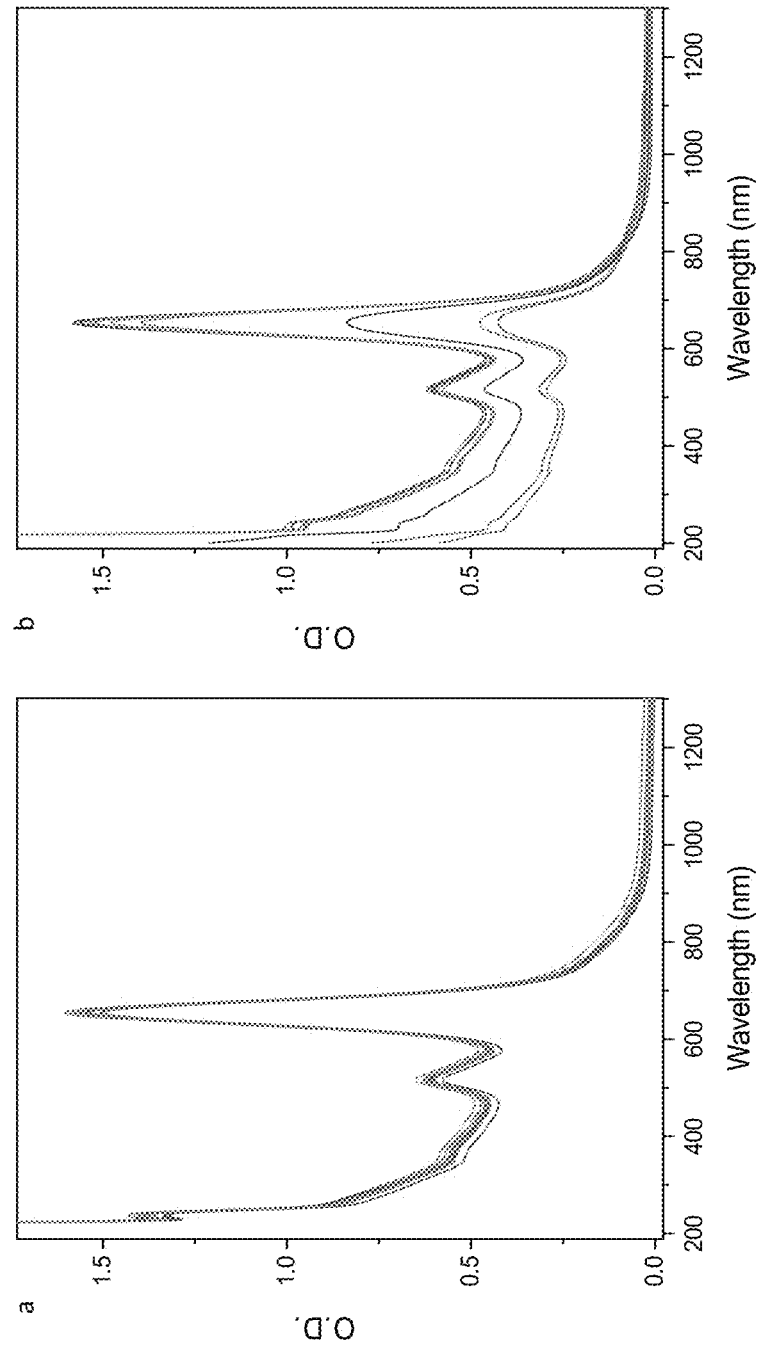

FIG. 15 depicts the effect of repeated centrifugation on particle aggregation. AuNR solution was centrifuged at 8000 rpm for 10 min. After the centrifugation, instead of decanting the supernatant, the sedimented AuNRs were re-dispersed in the supernatant by brief sonication and the tube was placed in warm water bath to dissolve CTAB. This procedure was repeated. UV-Vis-NIR extinction spectra of a) dispersion of AuNRs at [CTAB]=0.15 M and b) dispersion of AuNRs at [CTAB]=0.0375 M.

Figure 16:
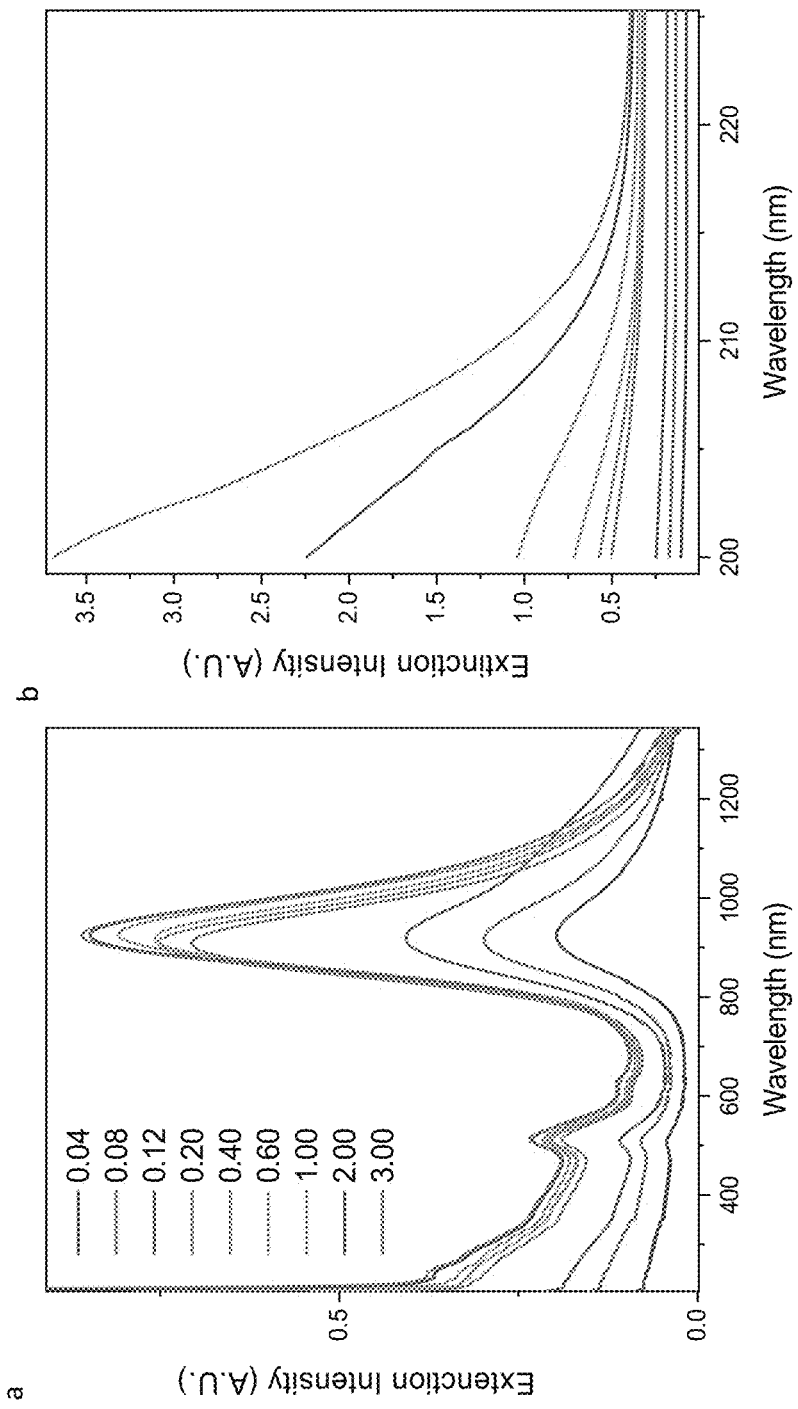

FIG. 16 the effect of decreasing [CTAB] on stability of AuNR solution at constant [AuNR]. Image (a) depicts UV-Vis-NIR extinction spectra of AuNR solutions with decreasing [CTAB] from 3 mM to 0.04 mM at constant [AuNR]~2.5 nM. Image b) depicts full spectra between 200 to 225 nm enlarged from (a). The change of CTAB concentration may be estimated by the extinction intensity at 200 nm.

Figure 17:
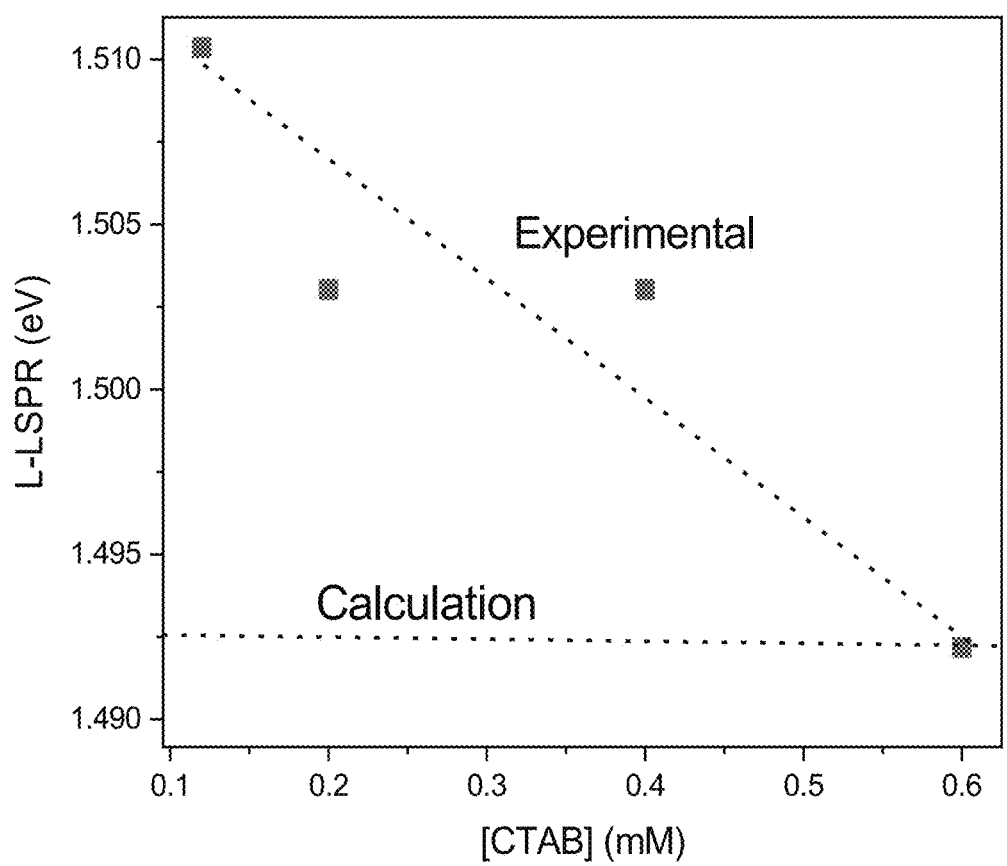

FIG. 17 depicts the change of L-LSPR as a function of [CTAB] at fixed [AuNR] compared with the theoretical Gans' calculation assuming the change of bulk refractive index of CTAB and H$_2$O mixed mixture. The slope from the fitting of experimental data was −3×10$^{-2}$ eV/mM and the slope from the calculation was −3×10$^{-5}$ eV/mM.

Figure 18:
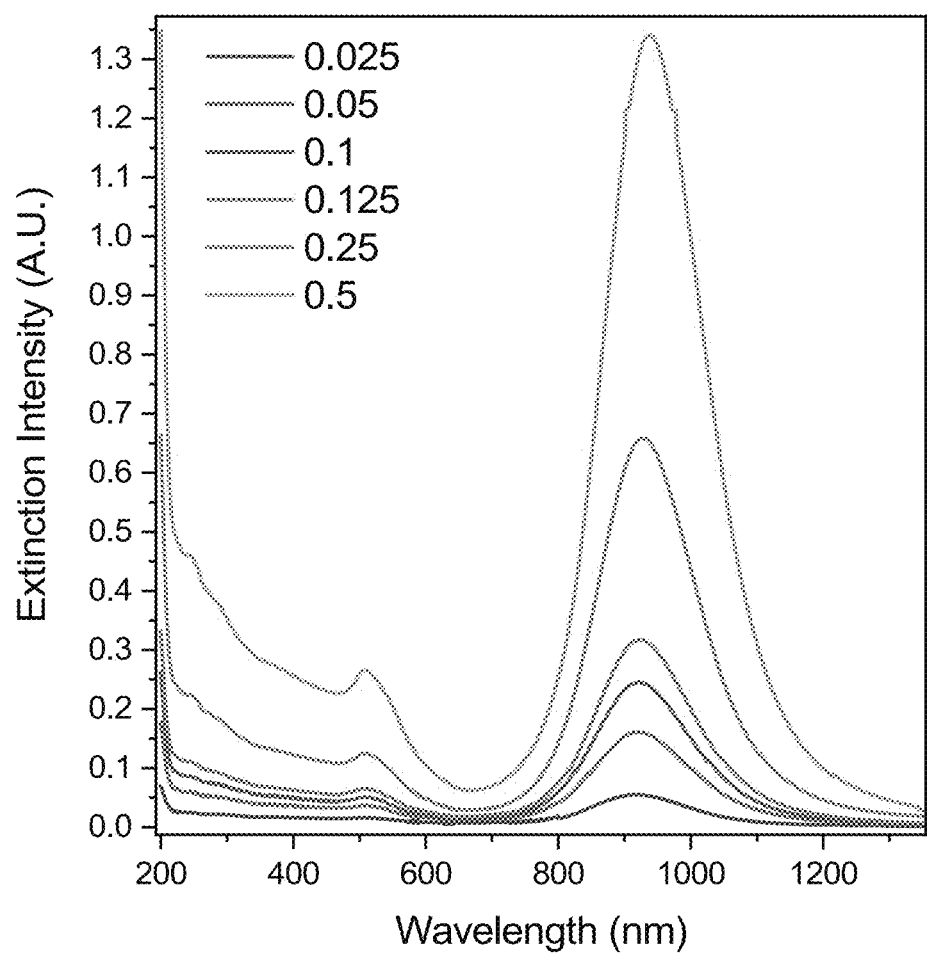

FIG. 18 depicts UV-vis-NIR extinction spectra of AuNR solutions with decreasing both [CTAB] and [AuNR]. a) UV-Vis-NIR extinction spectra of AuNR solutions with decreasing both [CTAB] and [AuNR] at fixed [CTAB] to [AuNR] ([CTAB]/[AuNR]~5×10$^4$).

Figure 19:
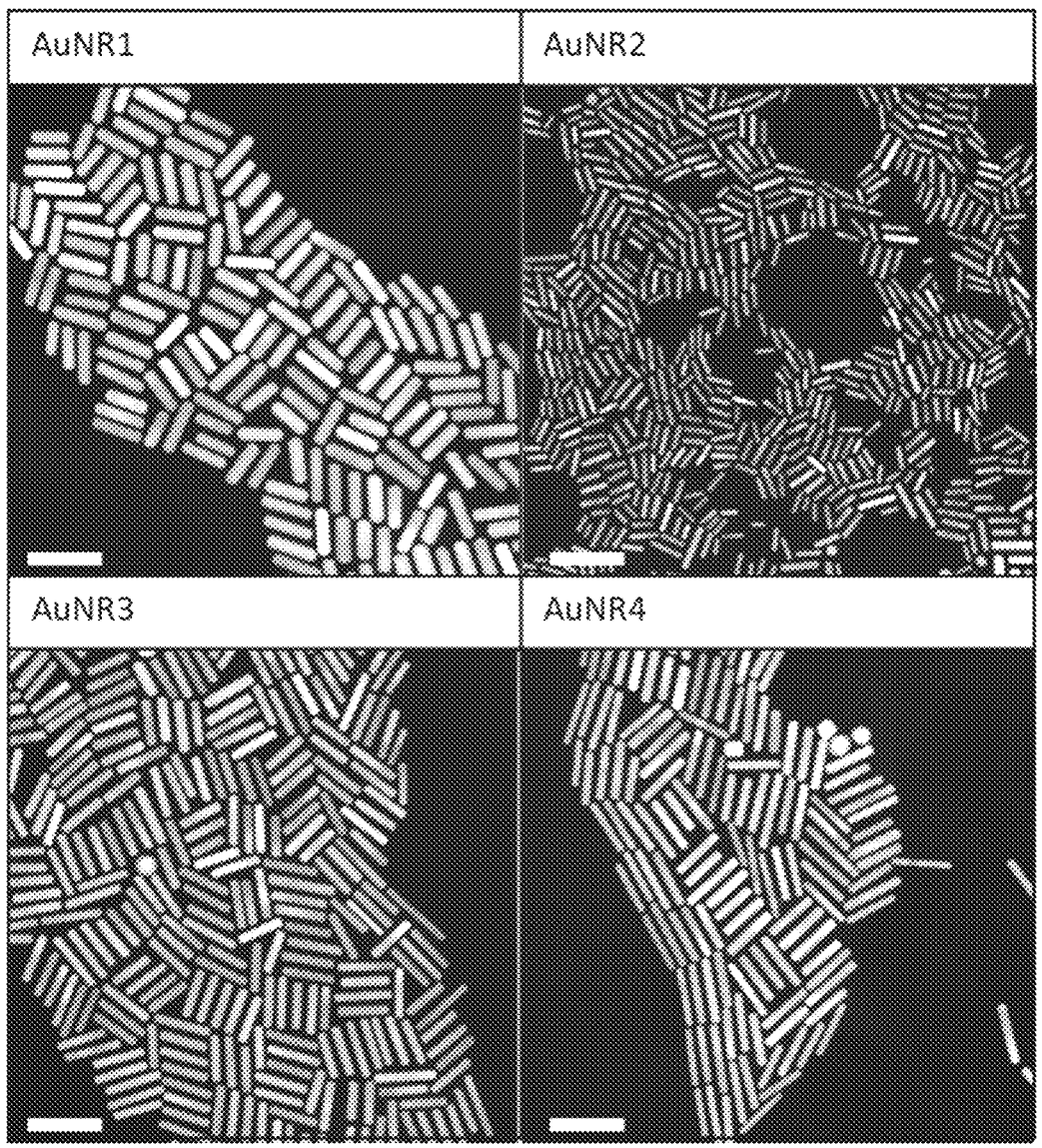

FIG. 19 depicts STEM images of AuNRs shown in FIG. 3B, Image (d). The scale bar is 100 nm.

Figure 20:
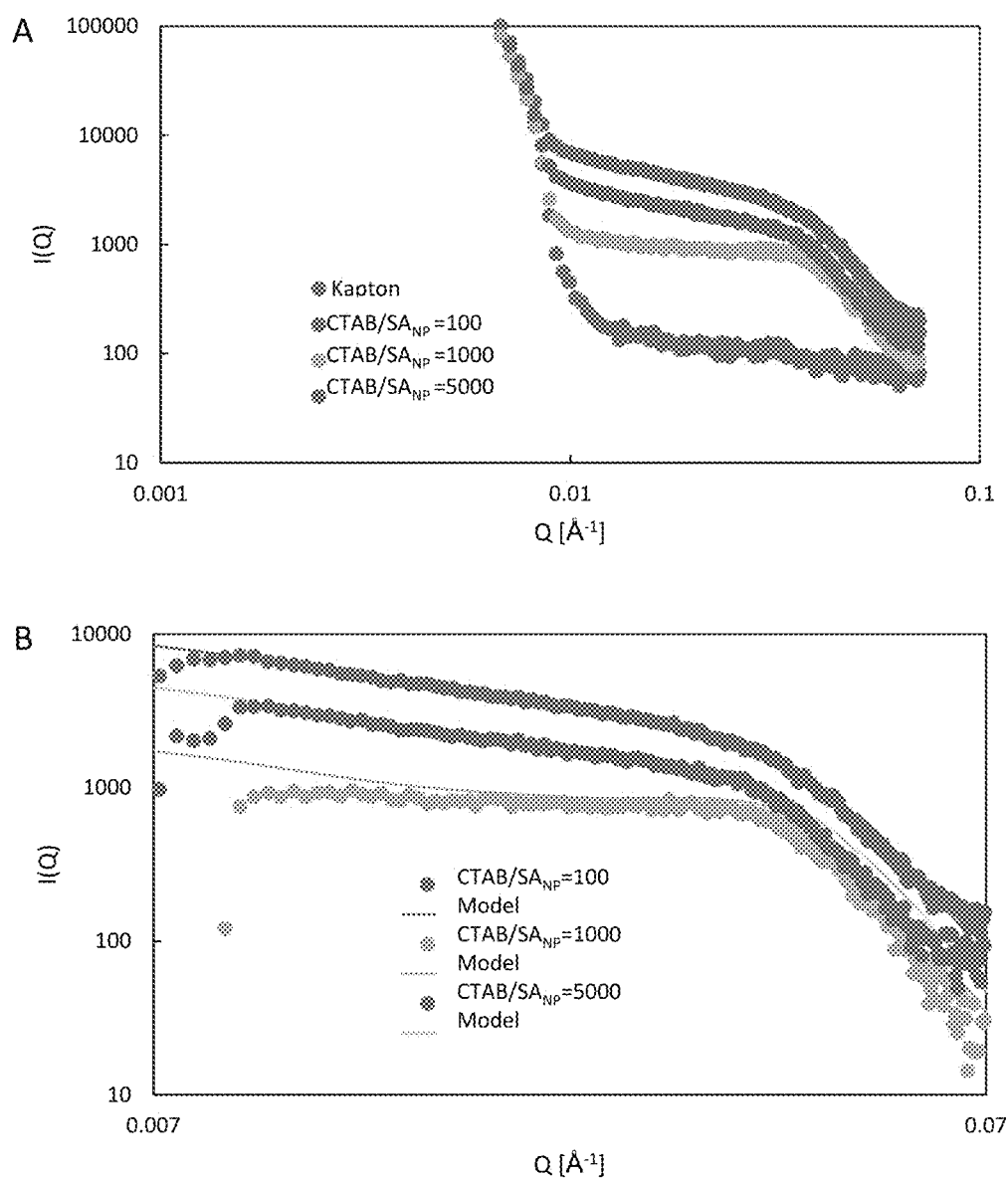

FIG. 20 depicts AuNR SAXS (Small Angle X-ray Scattering) data. Raw 1D data are shown in Image (a), and the background-subtracted data are shown in Image (b).

Figure 21:
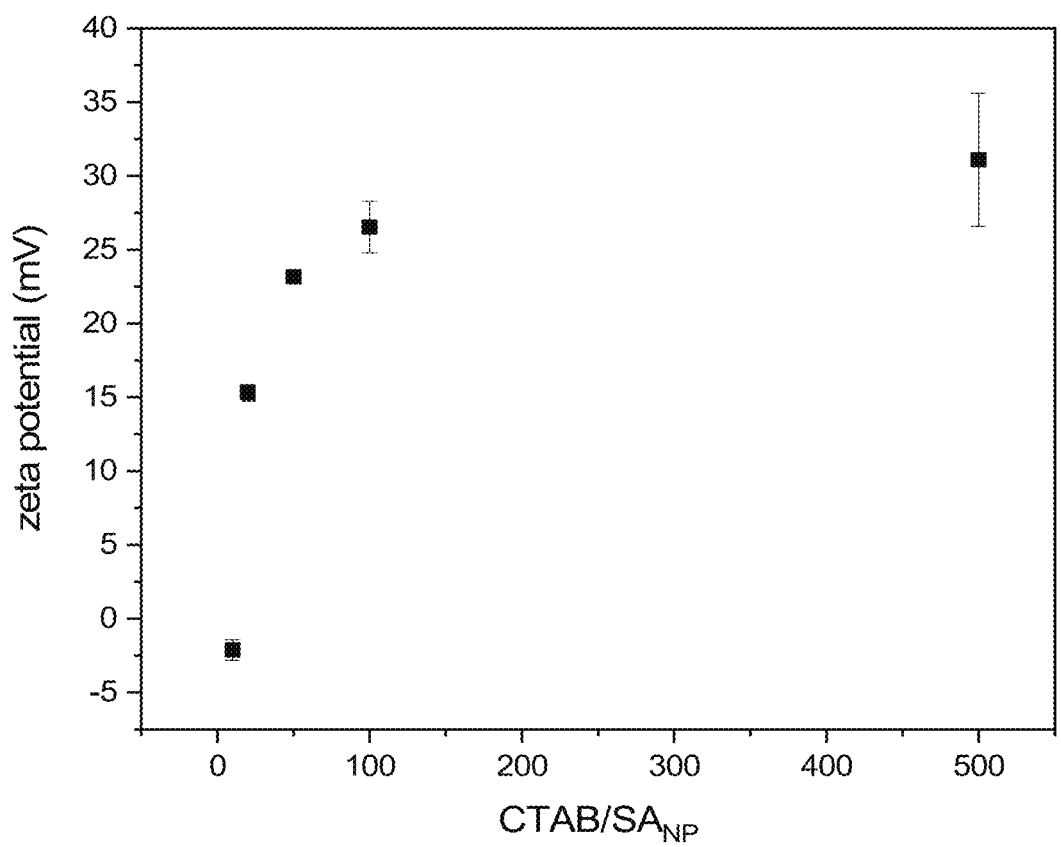

FIG. 21 depicts the change of Zeta potential of AuNRs as a function of CTAB/SA$_{NP}$.

Figure 22:
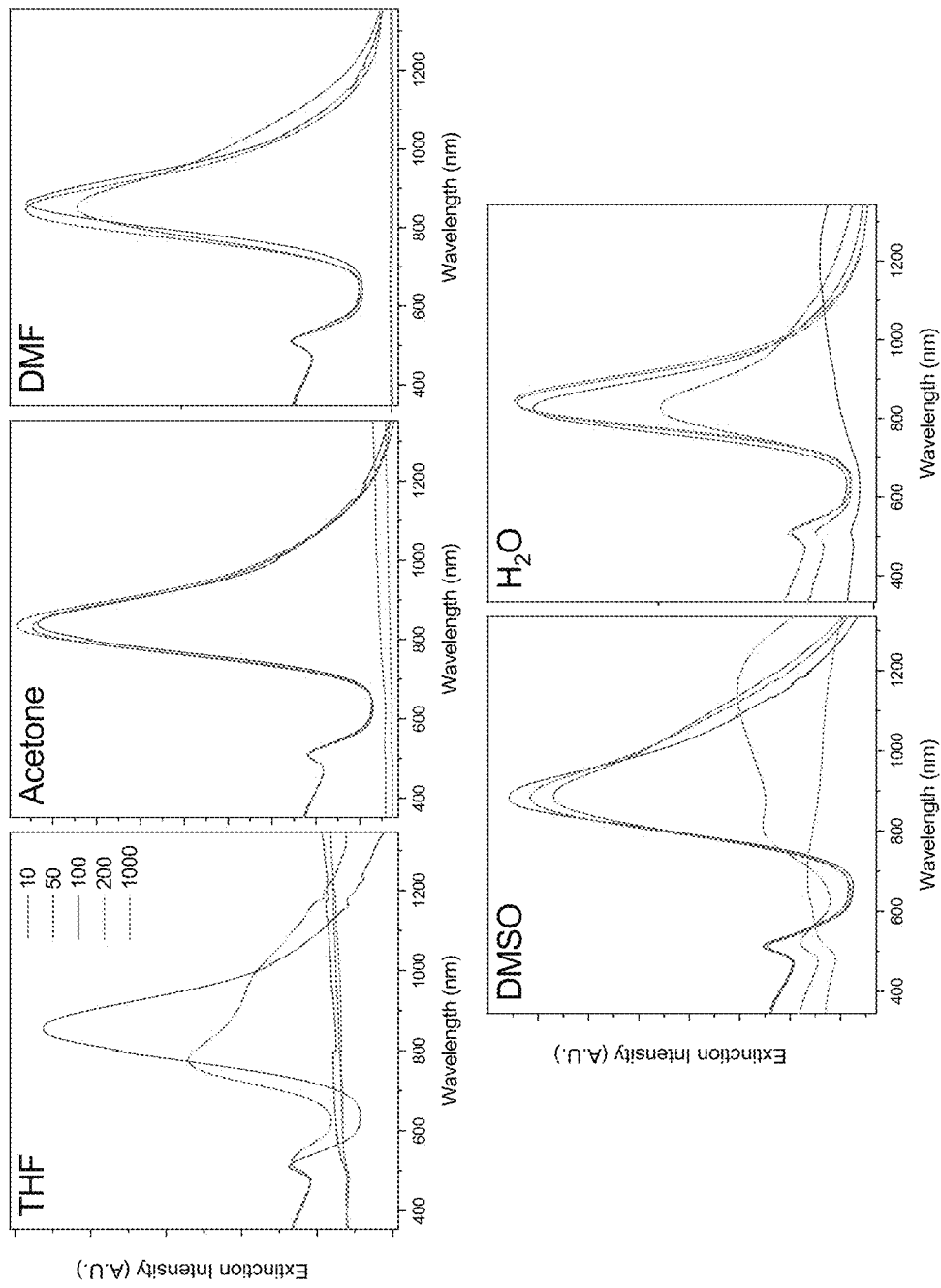

FIG. 22 depicts the stability of AuNRs in H$_2$O and various aprotic polar solvents estimated via optical characterization. 100 μl of Au NRs with different CTAB/SA$_{NP}$ from 10 to 1000 were dispersed in 2 ml of various solvents and UV-Vis-NIR spectra were obtained after 24 hr (AuNR AR~4.2, 2r~7.1 nm, L~29.9 nm).

Figure 23:
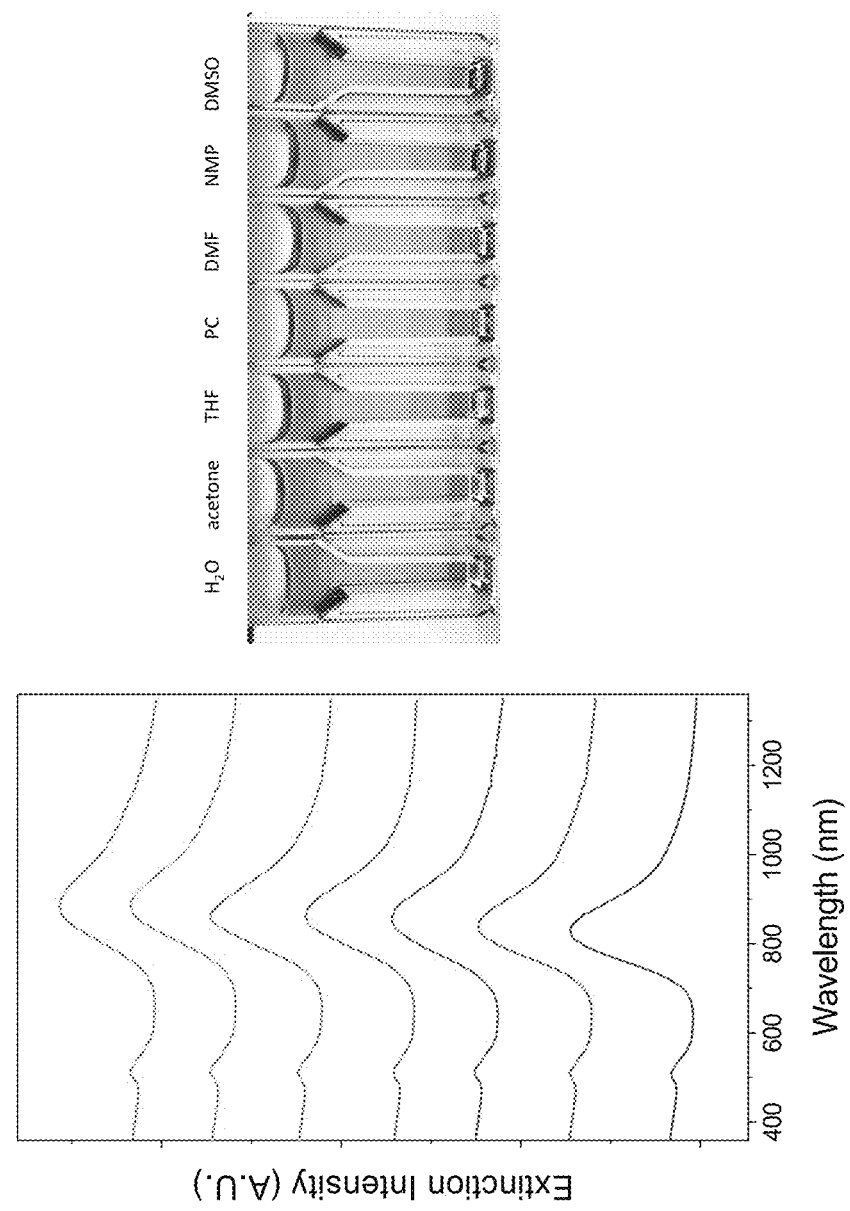

FIG. 23 depicts UV-Vis-NIR extinction spectra of AuNR dispersion in various aprotic polar solvents.

Figure 24:
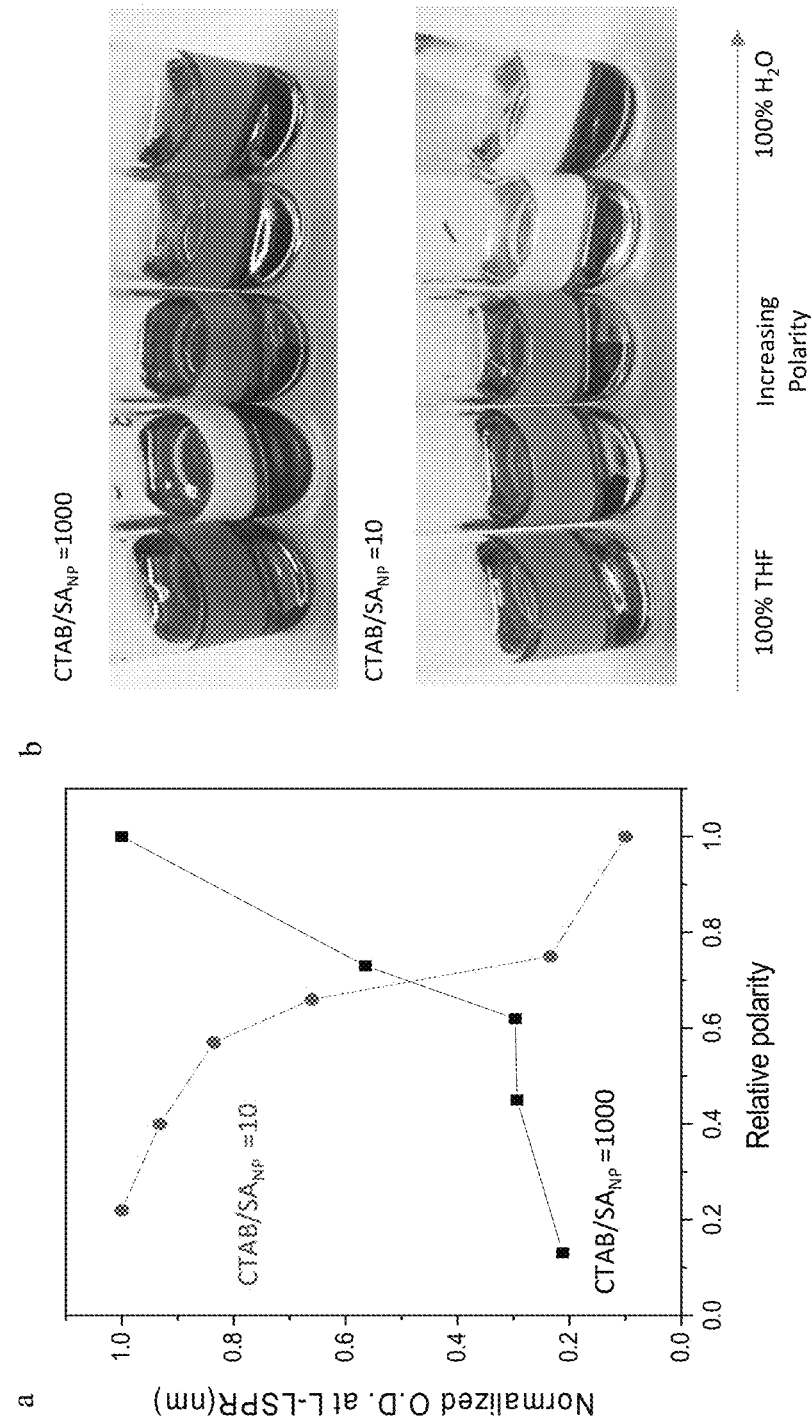

FIG. 24 depicts the stability of AuNRs in H$_2$O/THF mixture. Image (a) depicts a chart, and Image (b) presents images demonstrating changes in spectroscopic behavior and stability when the polarity of the medium is gradually shifted via blending miscible solvents, $H_2O$ and THF.

Figure 25:
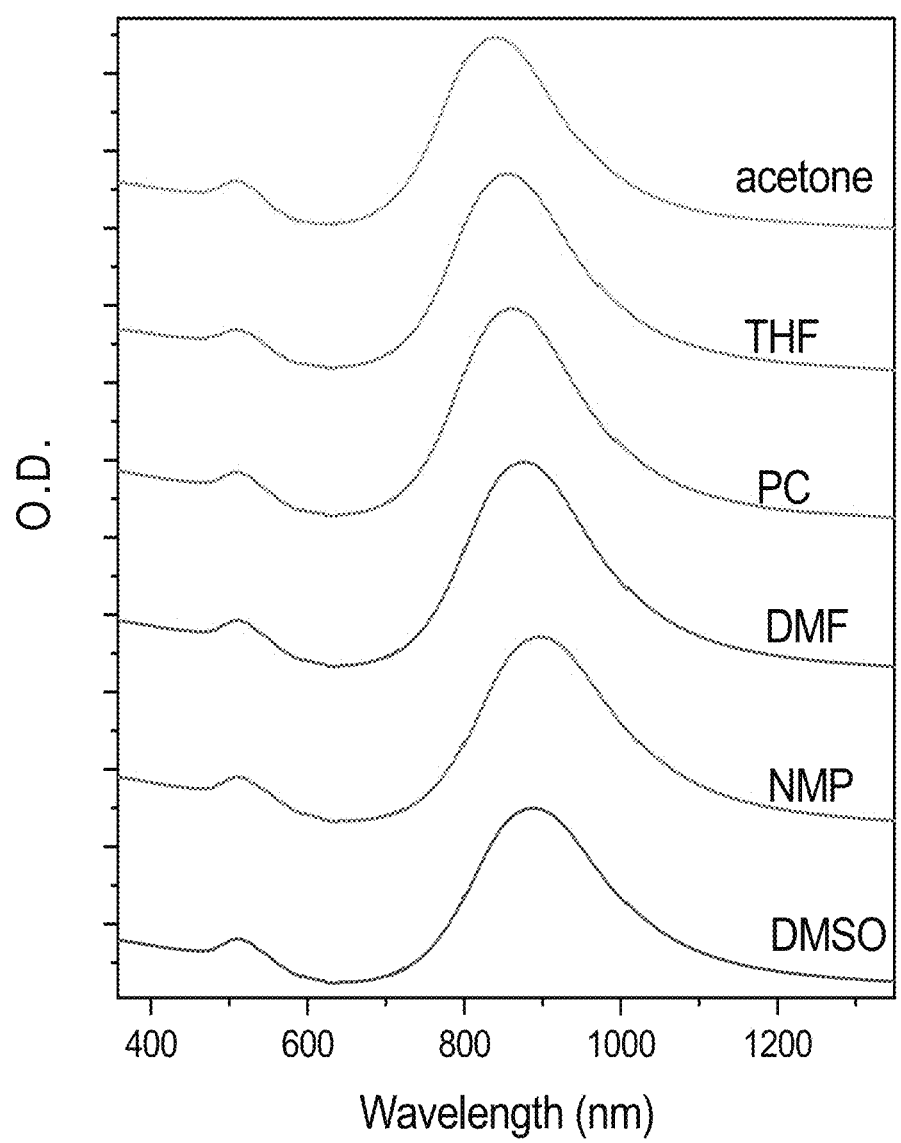

FIG. 25 depicts UV-vis-NIR spectra of AuNR anhydrous dispersion in various aprotic polar solvents.

Figure 26:
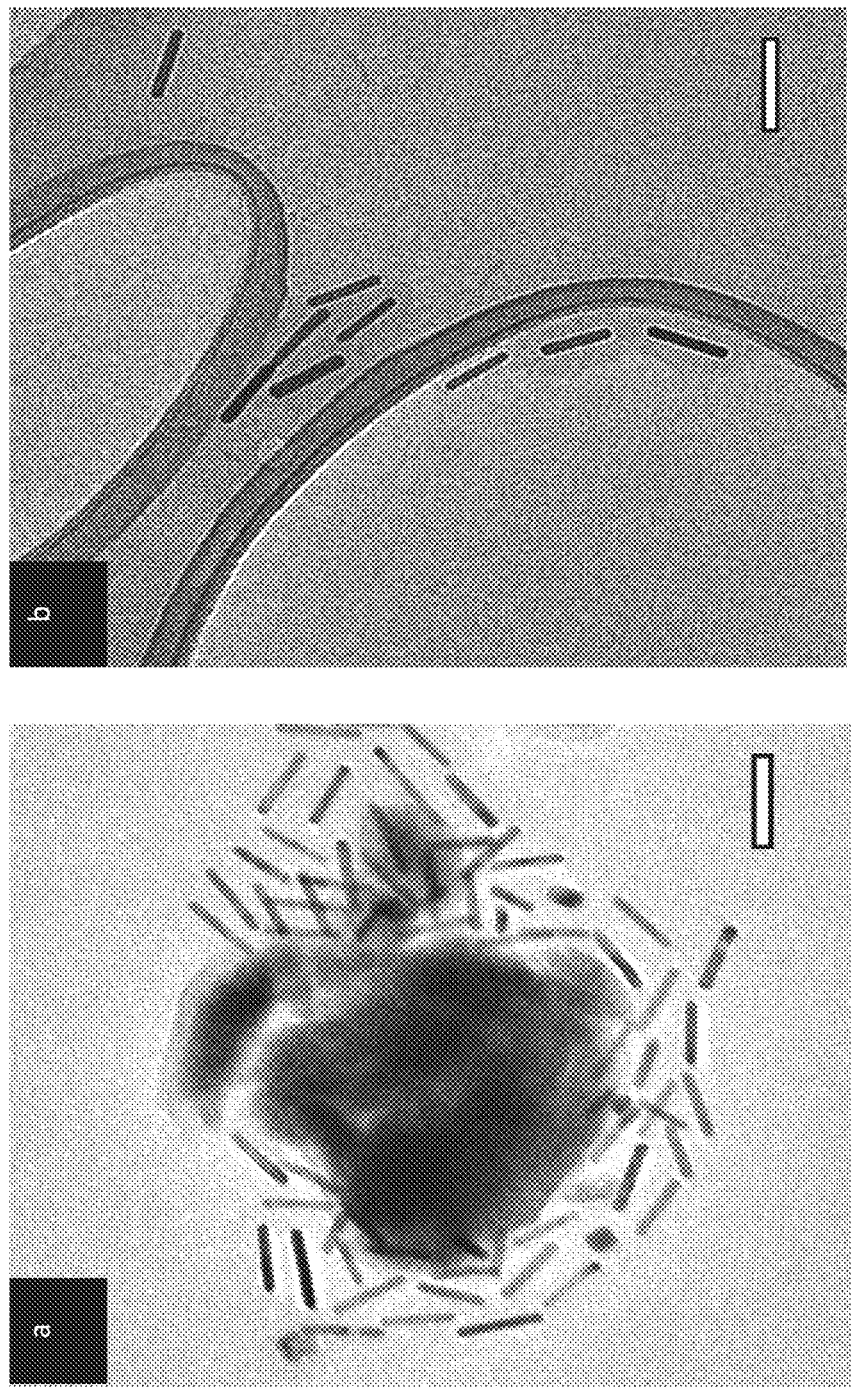

FIG. 26 depicts TEM images of PS (53 k) grafted AuNRs. Images (a) and (b) depict the irreversible, colloidally-stable aggregates that form if the PS—SH concentration is not sufficiently high to drive a rapid reaction.

Figure 27:
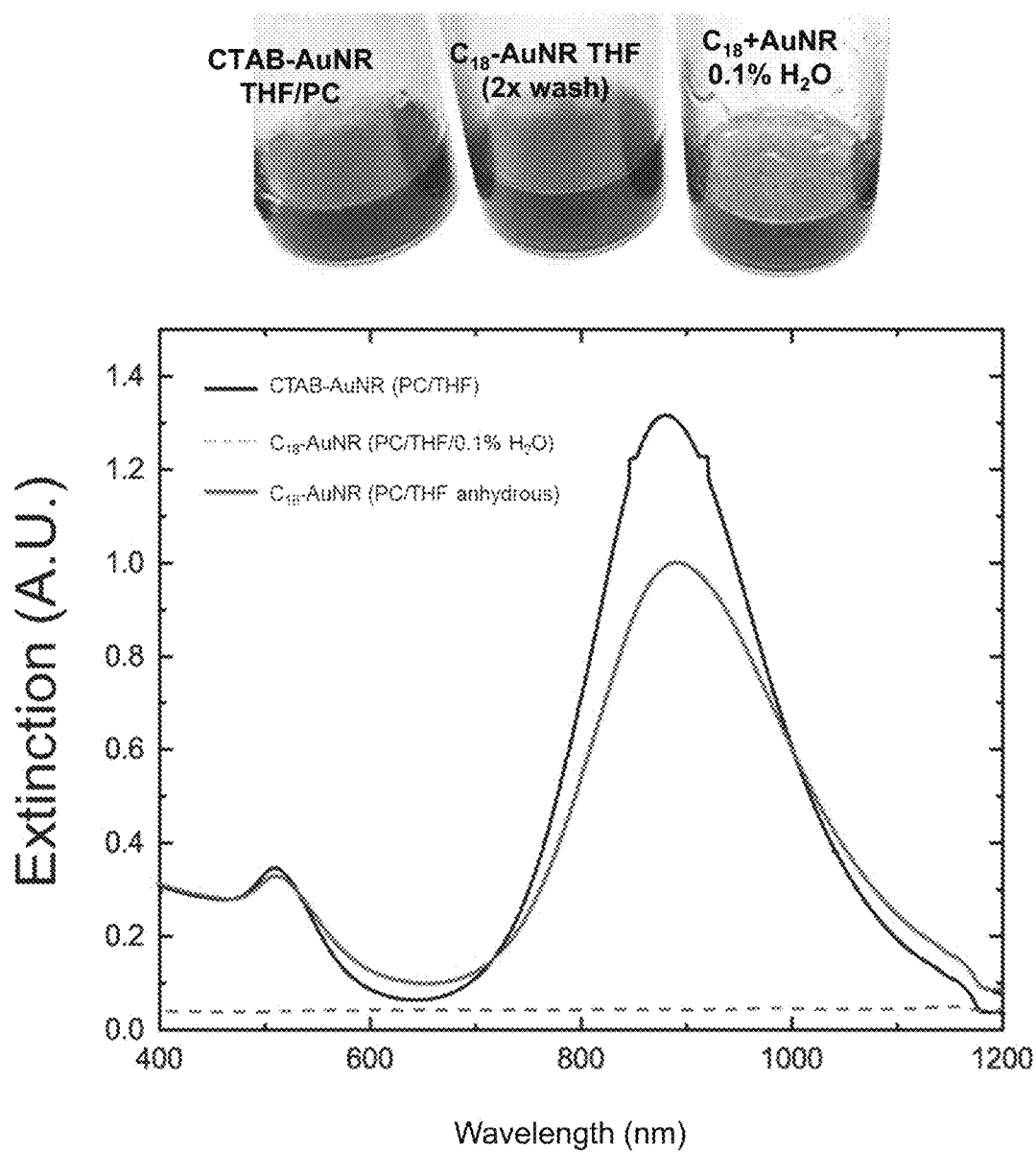

FIG. 27 depicts UV-vis-NIR Spectra of Grignard Functionalized AuNRs. The upper image depicts the detrimental effect of a small amount of water (0.1% by volume) added to the anhydrous dispersion, and the lower image presents extinction spectra of the washed and as functionalized (in PC/THF) are similar, and that the plasmonic features indicate minimal aggregation.

DETAILED DESCRIPTION OF THE INVENTION

Figure 1:
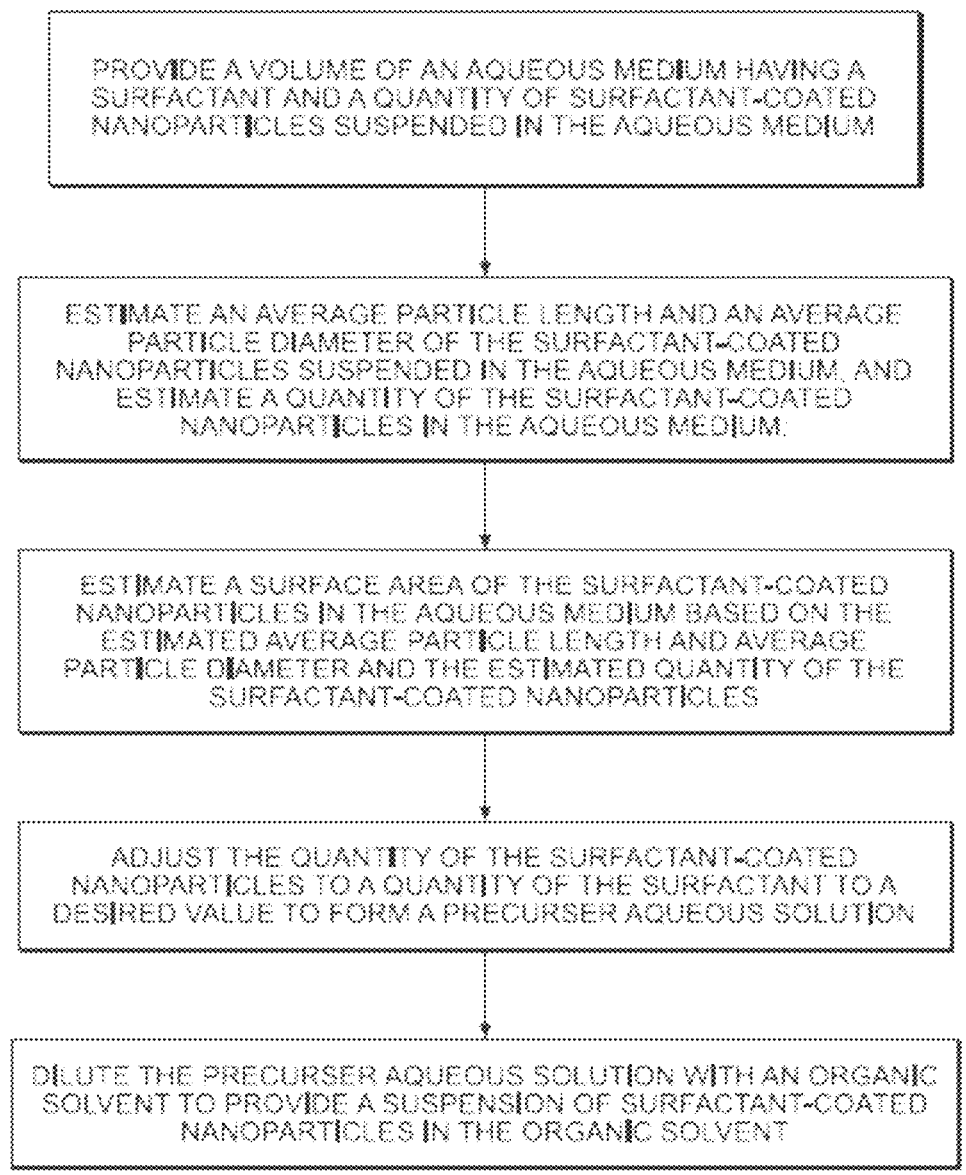
FIG. 1 describes a process for preparing surfactant-coated nanoparticles for transfer from an aqueous medium to an organic solvent medium according to the invention.

With reference to FIG. 1, there is shown a process according to the disclosure for preparing surfactant-coated nanoparticles for transfer from an aqueous medium to an organic solvent medium.

Surfactant-coated nanoparticles provide seed crystals for synthesis or growth of nanostructures or nanoparticles from the seed crystals. Effective preparation of the nanoparticles for transfer from an aqueous medium to an organic solvent medium enables the nanoparticles to be dispersible in the organic solvent. The ability to effectively prepare the surfactant-coated nanoparticles for use in an organic solvent enables their use for a variety of different applications associated with organic solvent-based synthesis of nanoparticles.

The invention is described below in connection with the preparation of surfactant-coated gold nanoparticles for transfer from an aqueous medium to an organic solvent medium for subsequent use in the synthesis of nanostructures. However, it will be understood that the invention may be utilized to prepare surfactant-coated nanoparticles from materials other than gold, including other metals, semiconductors, or oxides.

In accordance with the invention, a volume of an aqueous medium having a surfactant and a quantity of surfactant-coated nanoparticles suspended in the aqueous medium is initially provided. For example, gold nanoparticles may be initially provided in an aqueous solution having a surfactant. A preferred surfactant for use with aqueous gold nanoparticle solutions is a cetyltrimethylammonium surfactant, such as cetyltrimethylammonium bromide, preferably with surfactant concentrations of from about 0.05 to about 0.25 moles/liter, most preferably about 0.1 moles/liter.

Gold nanoparticles may be provided, for example, by adding gold seed crystals to the aqueous surfactant solution to initiate growth of gold nanoparticles in the aqueous surfactant solution. During growth of the nanoparticles, the nanoparticles become surrounded by a layer of the surfactant. Upon cessation of growth of the nanoparticles, the resulting surfactant-coated nanoparticles in the aqueous medium are ready for further preparation in accordance with the disclosure. As part of this, the surface area (SA) of the surfactant-coated nanoparticles in the aqueous medium may next be determined.

The surface area (SA) refers to the surface area of the bare nanoparticles which are coated with surfactant, with the surface area (SA) being just the surface area of the nanoparticle excluding the surfactant coated thereon. The surface are of the nanoparticles may be determined in various ways, one of which is the estimation of the surface area (SA) as described further below. The estimation of the surface area (SA) of the surfactant-coated nanoparticles in the aqueous medium may be accomplished by one or more analytic techniques. In one such technique, an initial step involves estimating an average particle length and an average particle diameter of the surfactant-coated gold nanoparticles suspended in the aqueous medium. Transmission electron microscopy (TEM) or scanning electron microscopy (SEM) may be used for these estimations.

For example, the aqueous medium containing the surfactant-coated nanoparticles may be analyzed using ultraviolet-visible spectroscopy to obtain an estimate of the concentration of the surfactant-coated nanoparticles in the aqueous medium with an average particle size of the nanoparticles provided by TEM or SEM analysis. For rod-shaped nanoparticles, this may be accomplished by estimating the average length of the nanoparticles and an average diameter of the nanoparticles.

While the nanoparticles in the aqueous medium will be surfactant-coated nanoparticles, as noted above, it will be understood that the dimensions are of the bare nanoparticles, without any surfactant coating thereon. The concentration of the surfactant in the aqueous surfactant solution is a known quantity from the makeup of the solution. Alternatively, the concentration of the surfactant in the aqueous surfactant solution may be estimated. In either event, an estimate of the quantity of surfactant-coated nanoparticles in the aqueous medium may be determined.

An example of determination of an estimated surface area (SA) of the surfactant-coated gold nanorods in the aqueous medium is as follows: (a.) using TEM or SEM, an average length (L) and diameter (d) is measured. (b.) surface area (SA) is calculated assuming a spherocylinder nanoparticle shape using the formula:

$$SA = 4\pi\left(\frac{d}{2}\right)^2 + 2\pi\left(\frac{d}{2}\right)(L-d)$$

Using the surface area (SA) of the surfactant-coated nanoparticles in the aqueous medium, the ratio of the quantity of surfactant-coated nanoparticles to the quantity of surfactant is adjusted to a value in a range between SA/0.11 and SA/0.22 to form a precursor aqueous solution.

Figure 2:
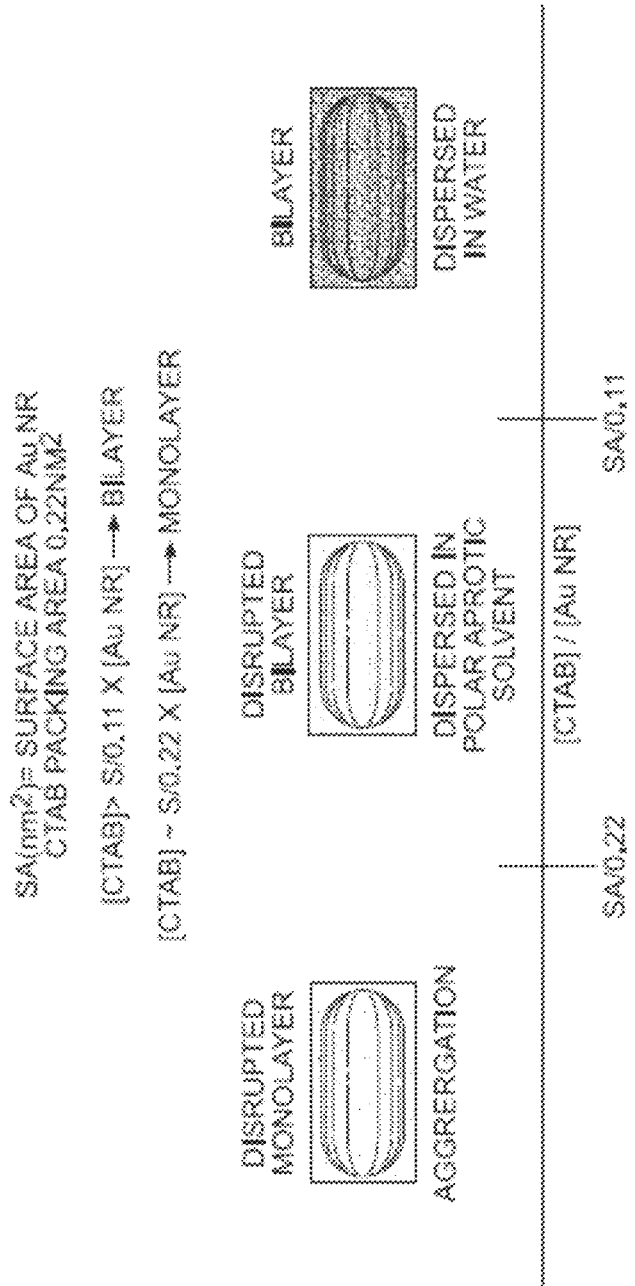
FIG. 2 depicts surfactant-coated nanoparticles.

For example, as noted above, the surface area (SA) refers to the surface area of the bare nanoparticles. Thus, the surface area of the bare nanoparticles is equal to SA. In the case of cetyltrimethylammonium bromide surfactant (CTAB), a single CTAB molecule occupies an area of 0.22 $nm^2$. Thus, to coat a nanoparticle with a single layer of surfactant, an amount of CTAB surfactant equal to SA/0.22 will be required. To form a bilayer of CTAB surfactant on the nanoparticle, the amount of surfactant required will be double, which corresponds to SA/0.11. This is visually appreciated in the FIG. 2, with the nanoparticles being gold nanorods, and referred to in FIG. 2 as AuNR, and the surfactant is CTAB. Restated, CTAB packing area is estimated as ~0.22 $nm^2$. Accordingly, the number/amount of CTAB to cover the surface of AuNR as a monolayer is SA/0.22 (unitless, $nm^2/nm^2$). If the CTAB makes bilayer, the number/amount of CTAB to cover the SA is 2×(SA/0.22)=SA/0.11. Therefore, for a monolayer, CTAB/$SA_{NP}$~4.5 and for a bilayer, CTAB/$SA_{NP}$~9. When CTAB/$SA_{NP}$>9, a bilayer forms. When 4.5<CTAB/$SA_{NP}$<9, the bilayer is disturbed (this is the range for phase transfer). We observed good phase transfer when 10<CTAB/SA$_{NP}$<20. This higher value is consistent with an equilibrium between free CTAB molecules in solution and an absorbed surface bilayer, and implies that the bilayer becomes unstable when the CTAB molecules in the solvent are reduced to less than 2-4 times of that on the Au surface.

The ratio of the quantity of surfactant-coated nanoparticles to the quantity of surfactant may then be adjusted by various methods to form the precursor aqueous solution. For example, the surfactant-coated nanoparticles may be separated from the surfactant solution to provide a mixture of a supernatant component and a solid component, and a portion of the supernatant component may be decanted to reduce the quantity of the surfactant.

Following formation of the precursor aqueous solution, the precursor aqueous solution is next diluted with an organic solvent to provide a suspension of the surfactant-coated nanoparticles in the organic solvent. The organic solvent may be a polar aprotic solvent, and is preferably selected from the group consisting of tetrahydrofuran, acetone, dimethylformamide, n-methylpyrrolidinone, dimethylsulfoxide, propylene carbonate, acetonitrile, and combinations thereof. The organic solvent may further be azeotropically distilled to reduce the quantity of residual water in the organic solvent.

Accordingly, it will be appreciated that the invention provides processes for preparing surfactant-coated nanoparticles for transfer from an aqueous medium to an organic solvent medium. The methods according to the disclosure are particularly suitable for both spherical and rod-shaped nanoparticles.

It has also been observed that the methods according to the disclosure advantageously do not affect the optical and physical properties of the nanoparticles, rendering them suitable for their intended uses.

Behavior of an Alkahest Canopy

Dispersibility of AuNRs can be quantified optically. When the particles sediment, the broadband optical density (O.D.) of the solution decreases due to a decreasing number (concentration) of colloidally-stable AuNRs. The O.D. at 400 nm is conventionally used to monitor the absolute concentration of gold in solution since it is dominated by absorption from Au interband transitions. Additionally, upon aggregation the extinction intensity and breadth of the longitudinal localized surface plasmon resonance (L-LSPR) weakens and shifts, respectively, due to plasmonic coupling between particles. Finally, the energy of the L-LSPR is sensitive to the refractive index of the medium (e.g. Mie-Gans theory), and thus spectral shifts of the resonance, without peak broadening, reflects changes in medium composition near the AuNR surface.

FIGS. 3A-3B summarize the use of these features to establish the impact of CTAB concentration on AuNR stability. Frequently, AuNR colloidal stability is associated with the absolute concentration of CTAB ([CTAB]) due to requirements for synthesis, and concentrations necessary for micelle formation and establishment of a bilayer on AuNR surface. For reference, the first critical micelle concentration (CMC) of CTAB is 1 mM, and the second CMC is 20 mM, above which the shape of the micelle transitions from sphere to wormlike.

Image (a) of FIG. 3A summarizes the extinction intensity at L-LSPR and 400 nm of AuNR dispersion (aspect ratio, AR~5.3, 2r~12.6 nm, l~66.7 nm) as CTAB concentration ([CTAB]) is decreased at constant AuNR concentration ([AuNR]~2.5 nM). Representative extinction spectra are summarized in FIG. 16. Detailed sample preparation and dilution procedures are summarized in Methods, below. Initially, the solution's extinction intensity is constant as [CTAB] is reduced, as expected from Beer-Lambert Law for a constant [AuNR]. At a critical concentration ([CTAB]$_C$~0.2 mM), however, the AuNRs aggregate and precipitate, markedly reducing the extinction intensity at 400 nm and at the L-LSPR. Image (b) of FIG. 3A summarizes the change of the position and FWHM of the L-LSPR peak. Their behavior also changes at [CTAB]$_C$, consistent with AuNR aggregation. For [CTAB]>[CTAB]$_C$, the L-LSPR blue shifts as the concentration decreases to approach [CTAB]$_C$. This shift (~3×10$^{-2}$ eV/mM) is much larger than anticipated if the energy of the L-LSPR was only affected by the average dielectric constant of medium ([CTAB] in H$_2$O: –3×10$^{-5}$ eV/mM, FIG. 17). This shift as [CTAB]→[CTAB]$_C$ likely reflects the local reduction of [CTAB] at the surface of AuNRs.

Since this critical concentration is lower than CTAB's CMC, the bulk solution is presumably dominated by solubilized CTAB molecules in equilibrium with CTAB layers absorbed on the particle surface. Since AuNR stability is determined by these bilayers, this equilibrium implies that the absolute concentration of AuNRs should also impact overall solution stability.

FIG. 3B, Image (c), demonstrates this dependence for different solutions at a constant [CTAB]/[AuNR]~5×10$^4$. Representative extinction spectra are summarized in FIG. 18. Detailed sample preparation and dilution procedures are summarized in Methods, below. As [CTAB] decreases in concert with [AuNR], the extinction intensity at L-LSPR and 400 nm linearly decreases in accordance with Beer-Lambert Law. In this instance, the AuNRs are stable at [CTAB] much lower than the aforementioned [CTAB]$_C$; or in other words [CTAB]$_C$ depends on AuNR concentration.

From these observations, the factor determining minimal AuNR stability is therefore not the absolute [CTAB], but the [CTAB] per the surface area (SA) of dispersed AuNRs (CTAB/SA$_{NP}$~[CTAB]/[AuNR]*(2πrl)$^{-1}$). The conversion from [CTAB] to CTAB/SA$_{NP}$ is described in detail in Table S1, below. This factor accounts for the equilibrium between solubilized and surface absorbed CTAB, as well as the surface-to-volume ratio of various AuNR structures. Image (d) of FIG. 3B summarizes a master curve of four different AuNRs with different aspect ratios and particle volume (detailed data summarized in Table S2 (below) and FIG. 19). The circle (⊕) corresponds to AuNR1, AR~3.8, 2r~16.8 nm, l~63.1 nm; the diamond (♦) corresponds to AuNR2, AR~4.2, 2r~7.1 nm, l~29.9 nm; (▲) corresponds to AuNR3, AR~5.3, 2r~12.6 nm, l~66.7 nm; and (▼) AuNR4, AR~6.3, 2r~12.0 nm, l~76.4 nm. TEM images of the rods are shown in FIG. 19. The extinction intensities at L-LSPR are normalized to the extinction intensity at CTAB/SA$_{NP}$=1000 to account for different initial [AuNR]. In all cases, the normalized extinction intensity is constant to CTAB/SA$_{NP|C}$~10 to 20, then dramatically decreases. Interestingly, this value is slightly larger than the number of CTAB molecules per bilayer in various CTAB crystal polymorphs (~5 CTAB molecules per nm$^2$ of bilayer (2.5 ammonium groups per nm$^2$ in the (001) plane)). Such a higher value is consistent with an equilibrium between free CTAB molecules in solution and an absorbed surface bilayer, and implies that the bilayer becomes unstable when the CTAB molecules in the solvent is reduced to less than 2-4 times of that on the Au surface.

FIG. 4 summarizes the anticipated CTAB structure on the Au surface as [CTAB] is reduced through CTAB/SA$_{NP|C}$.

When CTAB/SA$_{NP}$ is significantly higher than 20, e.g. 30 and above, a CTAB bilayer with terminal ammonium groups provide electrostatic stabilization. Consistent with this model, two CTAB bilayers separate the side-to-side AuNR assembles formed via centrifugal sedimentation at these [CTAB], where each bilayer was previously associated with an aqueously stable AuNR (L~5.6 nm @CTAB/SA$_{NP}$=100, SAXS, FIG. 20, Table S3, below). The separation distance, L, and the ability to re-disperse the sediment by adding water and agitating is in agreement with prior reports. As [CTAB] approaches CTAB/SA$_{NP|C}$, CTAB molecules are likely depleted from the bilayer to maintain equilibrium with solubilized CTAB molecules.

The resulting reorganization of the CTAB surface increases interface energy and reduces surface charge. The latter is consistent with reduced AuNR zeta potential as the CTAB concentration decreases (FIG. 21). At CTAB/SA$_{NP}$~10 to 20, the extent of CTAB depletion is sufficient to destabilize the AuNRs, and they irreversibly aggregate. Not wishing to be bound by theory, the specific molecular structure of disrupted CTAB layers on surfaces is still an active area of investigation, and thus the schematic is notional, emphasizing the change in local CTAB concentration and packing.

This model implies that the polarity of dispersed AuNRs may be tuned with CTAB concentration near CTAB/SA$_{NP|C}$. FIGS. 5-7 show this ability by demonstrating the dispersibility of CTAB stabilized AuNR (AR~4.2, 2r~7.1 nm, 1~29.9 nm) in various aprotic organic solvents (e.g. THF, acetone, DMF, DMSO). Specifically, 100 μl of aqueous AuNR stock solution ([AuNR]~5 nM) at various CTAB/SA$_{NP}$ (10-1000) was added to 2 ml of solvent. Note that water is miscible with all these solvents at these concentrations. FIG. 5 quantifies the dispersibility by extinction intensity at L-LSPR normalized by extinction intensity of AuNR solution at CTAB/SA$_{NP}$=1000 in H$_2$O (extinction spectra in FIG. 22). FIG. 6 shows the image of the solutions after 24 hr where the vials are horizontally arranged in the order of increasing solvent polarity. AuNRs with CTAB/SA$_{NP}$=1000 and 200 were stable in water (brown color); however they aggregated when added to the organic solvents. AuNRs in DMSO exhibited a purple-colored dispersion with UV-Vis-NIR spectrum reflecting the formation of both end-to-end and side-by-side assembly, whereas in the others solvents, the AuNRs completely settled after 24 hrs.

However, at CTAB/SA$_{NP}$=100, the AuNRs were generally stable in H$_2$O, DMSO, DMF, and acetone. When CTAB/SA$_{NP}$=50, they were stable in DMSO, DMF, and acetone, but slightly aggregated in H$_2$O and THF. Finally, at CTAB/SA$_{NP}$=10, the AuNRs were stable in all solvents except for H$_2$O. For single rod dispersions obtained from CTAB/SA$_{NP}$=10, the L-LSPR energy is red-shifted relative to water, FIG. 7 (extinction spectra in FIG. 23). These resonance shifts exhibit a strong correlation with refractive index of the solvent, and is consistent with the prediction by Gans' theory. Amazingly, these organic solvent dispersions were stable (no change in optical spectra) for at least 90 days at 23° C. Similar spectroscopic behavior and stability is seen when the polarity of the medium is gradually shifted via blending miscible solvents, for example H$_2$O and THF (FIG. 24).

The solubility of CTAB in the aprotic organic discussed above is lower than in water. For example, the solubility of CTAB in H$_2$O is 100 mg/mL, but 5.3 mg/mL in DMSO and only sparingly soluble in acetone. Thus free CTAB molecules in H$_2$O are more likely to integrate into the stabilizing ligand layer surrounding the AuNR in these organic solvents. In contrast, CTAB is extremely soluble in protic solvents such as ethanol, methanol, and isopropanol. For these, the AuNRs are not stable at any CTAB/SA$_{NP}$ ratio, presumably due to solubilization of the stabilizing CTAB layer from the AuNR surface. Therefore, the affinity between ligands and solvent is another key factor determining stability.

For the aforementioned AuNRs dispersion in aprotic polar solvents, trace amounts of H$_2$O remain in the mixture due to the dilution procedure. This adversely affects subsequent functionalization which strictly requires anhydrous condition such as the Grignard reaction. However, when AuNRs with CTAB/SA$_{NP}$=10 are diluted with propylene carbonate (PC) or NMP, the excess water can be removed by subsequent heating due to these solvents' high boiling points (240° C. and 202° C., respectively, which have higher boiling points than water). For example, FIG. 8 shows that when an aqueous AuNR solution is mixed with propylene carbonate (PC), the AuNRs initially in aqueous solution phase transfer within minutes to a stable dispersion in the PC phase. After heating the PC phase for 20 min at 100° C., trace H$_2$O disappears, resulting in an anhydrous dispersion of AuNRs in PC (FIG. 8, NIR spectra, water absorption from 1400 to 1500 nm).

This anhydrous dispersion can be added to other polar solvents, further expanding the mediums in which stable anhydrous AuNR dispersions can be obtained as shown in FIG. 9 (volume ratio of PC to other polar solvent is 1:9). Single rod dispersion is confirmed in all solvents by the lack of L-LSPR broadening (FIG. 25). The L-LSPR is red-shifted as shown in FIG. 9; and is consistent with the refractive index of the mixed solvents (calculated refractive index of mixed solvents is shown in Table S4, below).

Finally, AuNRs dispersion in H$_2$O at any CTAB/SA$_{NP}$ will not transfer to nonpolar solvents due to water-oil immiscibility, and CTAB acting as an emulsifier (w/o surfactant, water-in-oil emulsion). However, aprotic polar and non-polar solvents are miscible, enabling a sequential transfer route. FIG. 10 summarizes creation of AuNR dispersion in non-polar solvents using aprotic polar AuNR dispersions. For example, anhydrous AuNRs dispersion in PC ([AuNR]~10 nM) can be dispersed in chloroform and toluene, which has a relatively higher polarity than other non-polar solvents. Alternatively, blends of PC/THF AuNRs dispersion with various non-polar solvents, including hexane, result in stable dispersions. This method leads to excellent AuNRs dispersions in hexane, cyclohexane, toluene and chloroform (volume ratio of PC:THF:non-polar solvent=2:4:4), as indicated by the UV-Vis-NIR spectra shown in FIG. 11. The shift of L-LSPR is consistent with the refractive index of those multi component solvents (inset of FIG. 11).

In summary, the broad dispersibility of AuNRs in organic solvents discussed above, as well as the associated limitations, is consistent with reconfiguration of the amphiphilic CTAB molecules at the AuNR surface in response to the polarity of the surrounding medium.

FIG. 12 summarizes the proposed CTAB structure upon transfer to organic solvents. The relatively large surface energy of gold favors coordination by the charged ammonium head group. Additionally, induced charge formation between the free carriers in the AuNR and the surfactant (charged group) further increased surface binding energy. When a surfactant has intermediate solubility in a solvent, amphiphiles absorb and form a structure that minimizes interfacial energy at the gold, as well as solvent, interfaces. When the surfactant is highly soluble in a solvent, solvation energy competes with interfacial energy within the system's overall free energy. Amphiphile adsorption does not occur until extremely high concentration.

This results in a substantially reduced dispersibility, such as in ethanol. When the surfactant is sparingly soluble, surface absorption dominates, but only a single amphiphilic layer is necessary to minimize interfacial energy. The aliphatic tails provide compatibilization as long as their concentration is not sufficiently high to drive bilayer assembly, which would invert the interfacial energy. In these cases, colloid stability only occurs within a finite range of surfactant concentration, around the number of molecules per surface area of colloid that corresponds to an amphiphilic monolayer. Thus, the solubility of the surfactant, as well as interfacial energy, determines the dispersibility of the AuNRs in a specific organic solvent. The ability to transition efficiently between bilayer and monolayer stabilization motifs appears to be facilitated by disruption of the absorbed surfactant structures.

Utility of an Alkahest Canopy

To exhibit the utility of maintaining AuNR dispersions in organic solvents via a weakly coordinated surfactant, we demonstrate an improvement of the efficiency of conventional thiol based polymer grafting-to reactions, as well as efficacy of previously inaccessible Au—C coupling chemistries using the anhydrous dispersions.

PS (polystyrene) grafting to AuNRs is commonly used to disperse AuNRs in nonpolar solvents, for constructing hairy (polymer-grafted) nanoparticle assemblies, and fabricating polymer nanocomposites. The conventional protocol adds PS—SH dissolved in THF at 100-fold excess (relative to AuNR surface saturation) to CTAB stabilized AuNRs in water (CTAB/SA$_{NP}$>1000). If the PS—SH concentration is not sufficiently high to drive a rapid reaction, irreversible aggregates form that are colloidally stable, turning solution turns purple (FIG. 26).

In a successful reaction, the PS functionalized AuNRs sediment. The sediment is collected, and then subjected to multiple wash-centrifugation cycles to remove excess polymer and CTAB. As an example of a single cycle for functionalization, 2 ml of 2 nM AuNRs (AR=7, l=73.7 nm, 2r=10.6 nm) with CTAB/SA$_{NP}$=1000 in H$_2$O is mixed with 2 ml solution of PS—SH (0.2 mM, MW 53K) in THF. Upon mixing, the solution becomes turbid, and after 24 hr at 30° C., the aggregates completely sediment. The clear supernatant is decanted, and the sediment is washed with ethanol to remove excess CTAB. Excess PS—SH is then removed with THF by repeated centrifugation cycles until the concentration of free PS in the supernatant becomes negligible (see Methods, below). One-cycle results in ~4 w/w % PS grafted on AuNRs, and an average graft density of ~0.03 chains/nm$^2$ (FIG. 13, image (a)). Such approaches are believed to favor end-functionalization due to the preferential binding of CTAB to the crystal faces on the side of rods. Additional polymer grafting requires subsequent additions of PS—SH, and associated purification by centrifugation. The reaction becomes more challenging and yield decreases as molecular weight increases, resulting in a grafting-to limit generally around MW~50 k for PS grafting to AuNPs. These additional steps increase particles loss and waste of unreacted PS—SH.

In contrast, a homogenous grafting reaction, in which all the reactants and products are soluble, can be executed with AuNRs with CTAB/SA$_{NP}$=10 dispersed in THF. For example, 2 ml of 2 nM AuNRs with CTAB/SA$_{NP}$=10 dispersed in THF is prepared following aforementioned concepts. Then, instead of adding 2 ml of 0.2 mM PS—SH (MW=53 k), half the PS—SH is added via a gradual injection of 200 μL of a more concentrated solution (1 mM). The final mixture is clear brown, and does not show any sign of aggregation even after 24 hr at 30° C. After removal of unreacted PS as noted above, the homogenous grafting reaction resulted in 44 w/w % PS, a 10-fold increase in PS grafting (average graft density of ~0.29 chains/nm2) (FIG. 13, image (a)).

FIG. 13, images (b-c) compare the morphology of PS functionalized Au NR and associated monolayer films (processing details in Methods, below). The higher degree of functionalization results in more uniform films and narrower distribution of near-neighbor rod spacing. Also, the side-to-side and end-to-end distance is similar (30 nm), indicating a more uniform grafting of PS on the surface of Au NRs for the homogenous reaction (inset of FIG. 13, image (c), also FIG. 26).

As a second example of synthetic utility, anhydrous AuNR dispersions enables the exploration of novel water-free strategies for grafting ligands to surfaces. In particular, these dispersions are amenable to organometallic functionalization strategies, which afford direct grafting via Au—C bond formation. In contrast to Au—S architecture with a comparatively low bond dissociation energy (Au—S: 150-175 kJ/mol, similar to O—O peroxides; 140 kJ/mol), the stronger Au—C bond (Au—C: 480-500 kJ/mol, greater than C—C; >350 kJ/mol) should enhance stability. As-prepared aqueous AuNR dispersions do not have this suite of chemistry available to them; organometallics require anhydrous, organic solvents.

To demonstrate access to this grafting approach, concentrated and anhydrous AuNR dispersion in PC ([AuNR]=2 nM; AR=3.6, l=48.5 nm, 2r=13.5 nm) was diluted with THF (v %=90) and treated with an alkyl Grignard reagent, $C_{18}H_{37}$—MgBr. Over the course of 5 hours, the AuNRs remain colloidally stable. After product washing (2 times centrifugation 14,000 rpm, 10 minutes), the functionalized AuNRs were dispersible in pure THF and the optical properties are preserved. In contrast, if a small amount of water (0.1% by volume) is intentionally added to the anhydrous dispersion, Grignard addition drives rapid flocculation and an immediate color change (FIG. 27).

To confirm the formation of $C_{18}H_{37}$ functionalized AuNR species, the AuNRs are concentrated (centrifugation 14,000 rpm, 10 minutes), and redispersed in anhydrous toluene, an inaccessible solvent for the CTAB stabilized AuNRs (FIG. 15, image (a), inset). Extinction spectra of the $C_{18}H_{37}$ functionalized AuNRs in toluene is the same as CTAB stabilized AuNRs in THF/PC, other than the slight red shift of the L-LSPR due to the change of dielectric environment (FIG. 15, image (a)).

Unfunctionalized AuNRs flocculate and aggregate in toluene. Raman spectroscopy is utilized to confirm the displacement of CTAB after $C_{18}H_{37}$ functionalization (FIG. 15, image (b)). The dominant Raman peaks for the CTAB stabilized AuNRs at 174 cm$^{-1}$ which is absent for the free CTAB originates from Au—Br bond confirming the interaction of the CTA$^+$ chains through the head group with the Br– covered surface. After the functionalization, the peak at 174 cm$^{-1}$ is minimized and a new vibrational mode at 225 cm$^{-1}$ emerges. Also, the collapse of the peaks at 776 cm$^{-1}$ and 1350 cm$^{-1}$ which are the stretching vibrations of the trimethylammonium group in CTAB after the $C_{18}H_{37}$ functionalization confirms the removal of CTAB by $C_{18}H_{37}$ functionalization.

CONCLUSION

In this effort, the polarity of colloidal AuNRs was tuned by structural transformation of the stabilizing CTAB layer via tuning the overall CTAB concentration. The factor determining minimal AuNR stability is not the absolute [CTAB], but the [CTAB] per the surface area (SA) of dispersed AuNRs (CTAB/SA$_{NP}$). At CTAB/SA$_{NP}$~10 to 20, the extent of CTAB depletion is sufficient to disturb the CTAB bilayer and destabilize the AuNRs in H$_2$O. However, these AuNRs are dispersible in most aprotic polar solvents, likely due to a reconfiguration of the CTAB molecules to minimize the free energy by maintaining hydrophilic head group attached to gold surface and hydrophobic alkyl chain extending into the solvent. Anhydrous AuNRs dispersions can be obtained via phase transfer and thermal treatment, which further expands the range of AuNR dispersions to mixtures of non-polar and polar organic solvents.

The synthetic utility of maintaining stable organic disperse of AuNRs via a weakly coordinated surfactant is demonstrated by increasing grafting density of functional moieties for targeted surface modification and robust fabrication of polymer nanocomposites. Anhydrous AuNR dispersions in organic solvents enables the exploration of novel synthetic strategies for grafting ligands to surfaces, such as Grignard coupling.

Thus, tuning the polarity of AuNRs via CTAB structural transformation provides an alchemical alkahest canopy which provides a platform for new surface conjugation chemistries, as well as expands opportunities for modification of physiochemical properties of AuNRs via effective grafting-to reactions of functional moieties.

Methods

Materials:

Cetyltrimethylammonium bromide (CTAB) was purchased from GFS chemicals. HAuCl$_4$, AgNO$_3$, sodium borohydride and hydroquinone were purchased from Aldrich. Thiolated polystyrene (MW=53 k), PS—SH was purchased from polymer source. Alkyl Grignard reagent, C$_{18}$H$_{37}$—MgCl was purchased from Aldrich. All solvents were reagent grade and purchased from Sigma Aldrich.

Synthesis of Au NRs:

The Au seeds were prepared according to the typical synthetic route. 0.364 g of CTAB was added to 10 ml of 0.25 mM HAuCl$_4$. The solution was briefly sonicated (30 sec) and kept in a warm water bath (40° C.) for 5 min to completely dissolve CTAB and left at 25° C. for 10 min (solution A). A 0.01 M NaBH$_4$ solution was prepared and refrigerated (3° C.) for 10 min. 0.6 ml of 0.01M NaBH$_4$ solution was quickly added drop wise to solution A while stirring at 800 rpm causing the color of solution to become light brown as Au seeds form. Stirring continued for 1 minute before aging the seeds for 5 minutes prior to use in all experiments.

The AuNRs were prepared according to the scale up protocol. The growth solution was prepared by mixing HAuCl$_4$ (500 µL, 0.1 M), AgNO$_3$ (500 µL, 0.1 M), CTAB (0.1 g). Next, hydroquinone (1.25 ml, 0.1M) was added to the growth solution as a mild reducing agent. Initially, 350 µl of growth solution was added into seed solution. After 2 hours, an aliquot of growth solution was added at certain intervals to obtain a targeted aspect ratio and volume of the rods. The number of additions, the volume of the aliquot, and the length of the interval determines the final aspect ratio and volume of the rods.

Preparation of AuNR Dispersion at Different CTAB Concentration:

The [CTAB] of as-made AuNR solution is slightly higher than 0.1 M. Typically, the bulk [CTAB] was decreased by multiple centrifugation and re-dispersion in H$_2$O. However, excessive centrifugation causes aggregation even at [CTAB] higher than CMC (FIG. 15). We observed that when [CTAB]=0.0375M, which is higher than the critical micelle concentration (CMC) (0.001M), AuNRs start to aggregate after 5 iterations of centrifugation. To obtain a stable AuNR dispersion over the multiple centrifugations, a much higher concentration of CTAB is required (0.15 M). To independently control [CTAB] and [AuNR] concentrations without forced aggregation, the following steps were taken. The concentration of AuNRs was about 5 nM in the as-made solution. The as-made solution was centrifuged at 3000 rpm for 20 min to remove large AgBr particles and Au spheres. The supernatant containing AuNRs was collected and centrifuged at 10,000 rpm for 30 min. Nine tenths of the supernatant was discarded and the concentrated AuNR sediment was collected. The concentration of AuNR was approximately 50 nM and the CTAB concentration was the same as the as-made solution. The collected solution was centrifuged at 13,000 rpm for 30 min. Nine tenths of the supernatant was discarded and the sediment solution was re-dispersed in 0.1M CTAB solution. The centrifugation was repeated three times to remove all excess reactants and ensure stable AuNRs in 0.1 M CTAB solution. The resulting AuNR solution of [AuNR]=50 nM and [CTAB]=0.1M was used as a stock solution A.

To achieve AuNR dispersion at different [CTAB], the stock solution A was 10 times diluted with H$_2$O and the diluted solution was centrifuged (13,000 rpm for 30 min). Nine tenths of the supernatant was discarded and the sediment solution was collected ([AuNR]=50 nM, [CTAB]=0.01M) and used as a stock solution B. The stock solution B was 10 times diluted with H$_2$O and the diluted solution was centrifuged (13,000 rpm for 30 min). Nine tenths of the supernatant was discarded and the sediment solution was collected ([AuNR]=50 nM, [CTAB]=0.001M) and used as a stock solution C. Finally, the stock solutions A, B, and C were 20 times diluted with a variable concentration of CTAB solution as needed to obtain the final concentration ranging from 0.02 mM to 0.1 M.

Preparation of AuNRs with CTAB/SA$_{NP}$ of 10 to 1000:

CTAB/SA$_{NP}$ is estimated using the following equation.

$$CTAB/SA_{NP} = \frac{[CTAB]}{[AuNR] \times \text{surface area}}$$

For example, when [AuNR]=2.5 nM with dimension of L=66.7 nm, d=12.6 nm, CTAB/SA$_{NP}$ can be estimated from the data as shown in the Table S1.

Table S1. The conversion of bulk [CTAB] to CTAB/SA$_{NP}$ based on [AuNR] and the dimension of AuNRs.

| [CTAB] (mM) | CTAB/SA$_{NP}$ |
|---|---|
| 0.033 | 5 |
| 0.066 | 10 |
| 0.330 | 50 |
| 1.320 | 200 |
| 6.603 | 1000 |

Dispersion of AuNRs in Aprotic Polar Solvents:

One hundred µl of AuNR stock solution with various CTAB/SA$_{NP}$ of 10 to 1000 ([AuNR]=5 nM) was added to 2 ml of aprotic polar solvents such as THF, acetone, DMF, and DMSO.

Phase Transfer of AuNRs from $H_2O$ to Propylene Carbonate:

AuNR stock solution with CTAB/$SA_{NP}$ of 10 ([AuNR]=1 nM) was prepared. Five ml of stock solution was mixed with 5 ml of propylene carbonate. AuNRs slowly migrated into the PC phase within an hour. The AuNR dispersion in PC phase was isolated before removing trace $H_2O$ by heating the solution to 100° C. in water bath for 20 min.

Dispersion of AuNRs in Non-Polar Solvent:

AuNR stock solution in PC ([AuNR]=10 nM) was prepared (AuNR AR~4.2, 2r~7.1 nm, L~29.9 nm). Meanwhile, a mixture of THF and non-polar solvent was prepared at various volume fractions of THF ranging from 0 to 40%. 200 µl of AuNR stock solution was added 800 µl of solvent mixture.

Polystyrene Functionalization of AuNRs:

Heterogeneous grafting: 2 ml of 2 nM AuNRs (AR=7, L=73.7 nm, 2r=10.6) with CTAB/$SA_{NP}$=1000 in $H_2O$ is mixed with 2 ml solution of PS—SH (0.2 mM, MW 53K) in THF. Upon stirring the mixture, PS functionalized AuNRs are no longer stable in water/THF mixture and form bigger aggregates and rapidly sediment leaving clear supernatant. Note that when PS—SH concentration is not high enough, upon mixing the solutions, AuNRs form irreversible aggregation and the color of the solution becomes purple. After 24 hr at 30° C., the aggregates were completely sedimented. The clear supernatant is decanted, and the sediment is washed with ethanol to remove excess CTAB. The sediment is re-dispersed in THF and is subjected to multiple centrifugation cycles to remove excess free polymer and CTAB. The trace of free PS was monitored by UV-Vis-NIR absorption peak around 260 nm.

Homogeneous grafting: 2 ml of 2 nM AuNRs with CTAB/$SA_{NP}$=10 dispersed in THF was prepared following aforementioned concepts. 200 µL of 1 mM PS—SH THF solution is gradually injected. The final mixture is clear brown, and does not show any sign of aggregation after 24 hr at 30° C. After 24 hr at 30° C., multiple centrifugation cycles can be applied to remove excess free polymer.

Thin films of polymer-grafted Au NRs (PG-AuNRs) were prepared by casting PG-AuNR-toluene solutions using a custom-built flow-coater. Approximately 10 µl of PG-AuNR solution was inserted beneath the blade and the substrate. Films were subsequently deposited by moving the substrate at a fixed velocity via a translational stage. The angle and gap between the blade and substrate were 5° and 250 µm, respectively. Film thickness was controlled by varying PG-AuNR concentration (100-300 nM) and/or deposition velocity (0.1-10 mm/s).

Grignard Reaction:

The concentrated and anhydrous AuNR dispersion in PC ([AuNR]=2 nM, L=32 nm, d=9 nm) was diluted with THF (v %=90) and treated with 35 µL alkyl Grignard reagent, $C_{18}H_{37}$—MgCl (0.05 M in THF). The reaction solution was kept for four hours and the product was collected by centrifugation (14,000 rpm, 10 minutes) and redispersed in THF. UV-Vis spectra were recorded of the initial dispersion, and after introduction of Grignard (15 minutes). As a controlled experiment, a small amount of water (0.1% and 0.5% respectively by volume) was intentionally added to the anhydrous dispersion. Grignard addition drives rapid flocculation and an immediate color change.

Characterization: UV-Vis-NIR spectra were acquired with a Cary 5000 UV-Vis-NIR spectrophotometer. 1 mm path cuvette was used for most of the measurement. Morphology and mean size of nanoparticles were determined by TEM and STEM (FEI Talos at 200 kV). For each sample, more than 1000 particles were measured to obtain the average size and the size distribution. Zeta potential was measured using Zeta Sizer.

SAXS measurements of gold nanorod aggregates cast on Kapton tape were made using a Rigaku Smartlab x-ray diffractometer with Smartlab Studio II software. This instrument used a Cu-Kα x-ray source (x-ray wavelength λ=1.54 Å). Scattering vectors Q=4π sin(θ/2)/λ from 0.006 to 0.07 Å$^{-1}$ were examined, where θ is the scattering angle. Background measurements were made by examining the scattering from an identical piece of Kapton tape under the same conditions, and then subtracted from the nanorod film+ Kapton measurements to obtain the scattering from only the gold nanorod films.

Data were analyzed using IGOR Pro version 6.37, using Irena small-angle scattering analysis macros. A cylinder form factor and Percs-Yevick hard-sphere structure factor were used to fit the data. The cylinder radius 4.6 nm and length 56 nm were fixed based on TEM images of the gold nanorods, while the scattering intensity, interparticle distance, and the fraction of nanorods forming aggregates were adjusted to provide the best fit. Fit parameters are listed in Table S3, and the fit lines are shown in FIG. 20.

Thermogravimetric analysis (TGA) was carried out on a Mettler Toledo TGA/SDTA851e instrument. Samples were heated from 25 to 700° C. at a heating rate of 10° C./min, under nitrogen flow.

TABLE S2

Characterization of AuNRs shown in FIG. 3B, Image (d).

|  | AuNR 1 | AuNR 2 | AuNR 3 | AuNR 4 |
|---|---|---|---|---|
| Aspect ratio | 3.76 | 4.21 | 5.28 | 6.34 |
| Length (nm) | 63.10 | 29.90 | 66.66 | 76.36 |
| Width (nm) | 16.80 | 7.10 | 12.62 | 12.03 |
| Volume (nm$^3$) | 14612.73 | 1230.64 | 8605.43 | 8907.29 |
| L-LSPR (nm) | 760 | 835 | 924 | 1044 |

Characterization of CTAB bilayer with SAXS Characterization of spacing between AuNRs via SAXS.

TABLE S3

Summary of SAXS analysis.

|  |  | SF | Φ | $d_{corr}$ [nm] | $d_{max}$ [nm] |
|---|---|---|---|---|---|
| Low CTAB | CTAB/$SA_{NP}$ = 100 | 6.3 | 0.09 | 14.8 | 5.6 |
| Medium CTAB | CTAB/$SA_{NP}$ = 1000 | 2.2 | 0.2 | 15.4 | 6.2 |
|  | CTAB/$SA_{NP}$ = 5000 | 3.4 | 0.1 | 15.4 | 6.2 |

Parameters used in fitting the background-subtracted SAXS data for the gold nanorod aggregates. SF is the scaling factor for the scattering intensity, which is a function of instrument flux, sample thickness, and gold nanorod concentration, given that our data are on a relative rather than an absolute intensity scale. Φ is the fraction of particles that form part of an aggregate. The correlation distance $d_{corr}$ is the average distance between the centers of two nanorods that are nearest neighbors. The maximum possible spacing between the nanorods $d_{max}$ is calculated assuming that the rods are parallel and that their centers are not offset along their long axis, via $d_{max}=d_{corr}-2r_{rod}$.

FIG. 21 depicts the change of Zeta potential of AuNRs as a function of CTAB/$SA_{NP}$.

FIG. 22 depicts the stability of AuNRs in aprotic polar solvents.

| | Aprotic polar solvent | | | Polar & Non polar solvents mixture | | |
|---|---|---|---|---|---|---|
| | 100% | 10 v % $H_2O$ | 10 v % PC | | 100% | 40:40:20 (Solv:THF:PC) |
| acetone | 1.359 | 1.356 | 1.365 | hexane | 1.375 | 1.397 |
| THF | 1.407 | 1.399 | 1.408 | cyclohexane | 1.427 | 1.417 |
| PC | 1.419 | 1.410 | | chloroform | 1.445 | 1.425 |
| DMF | 1.431 | 1.420 | 1.429 | toluene | 1.497 | 1.445 |
| NMP | 1.470 | 1.456 | 1.465 | | | |
| DMSO | 1.479 | 1.464 | 1.473 | | | |
| $H_2O$ | 1.333 | | | | | |

FIG. 23 depicts UV-Vis-NIR extinction spectra of AuNR dispersion in various aprotic polar solvents. 100 µl of Au NRs with CTAB/$SA_{NP}$=10 in $H_2O$ was added to 2 ml organic solvent. The extinction spectra were taken obtained after 24 hr (AuNR AR~4.2, 2r~7.1 nm, L~29.9 nm).

Table S4. Refractive index of solvent mixture. The refractive index of mixed solvents was calculated based on the Gladstone-Dale equation, $$n - 1 = \sum_{k=0}^{k}(n_1 - 1)\phi_i$$

where, n is the refractive index of mixed solvent.

FIG. 24 depicts the stability of AuNRs in $H_2O$/THF mixture. Au NRs with CTAB/$SA_{NP}$=10 and 1000 were dispersed in $H_2O$/THF mixture with different volume fraction. a) Change of normalized optical density at L-LSPR as a function of relative polarity which was estimated from literature. b) Change of the color of the solution as the volume fraction increases (AuNR AR~4.2, 2r~7.1 nm, L~29.9 nm).

FIG. 25 depicts the anhydrous dispersion of AuNRs in various aprotic polar solvents. Concentrated AuNRs solution was prepared in PC and mixed with various solvents at volume ratio of 1:9 (PC to other polar solvent).

FIG. 26 depicts the functionalization of Au NR.

FIG. 27 depicts Grignard reaction-based functionalization of AuNRs.

FIG. 27 depicts UV-Vis Spectra of Grignard Functionalized AuNRs. Initially, AuNRs in PC/THF were mixed with alkyl Grignard species ($C_{18}H_{37}$MgBr). UV-Vis spectra were recorded of the initial dispersion, and after introduction of Grignard (15 minutes). Subsequently, the dispersion was centrifuged at 14,000 RPM for 10 minutes, the solvent removed, and redispersed in anhydrous THF. This process was repeated twice to ensure removal of Grignard reagents, PC, and by-products of the reaction (e.g. CTAB, $MgBr_2$). Extinction spectra of the washed and as functionalized (in PC/THF) are similar, and plasmonic features indicate minimal aggregation. Images from left to right: initial dispersion of AuNR in PC/THF (PC:THF=1:9); AuNR after functionalization and washing with THF; AuNR with Grignard with co-addition of 0.1% water.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method for preparing an anhydrous nanoparticle dispersion, comprising the steps of:
   a. providing an aqueous medium comprising a surfactant and a quantity of surfactant-coated nanoparticles suspended in the aqueous medium, wherein the surfactant is cetyltrimethylammonium bromide (CTAB);
   b. i. estimating an average particle length and an average particle diameter of the surfactant-coated nanoparticles suspended in the aqueous medium, and
      ii. estimating a quantity of the surfactant-coated nanoparticles in the aqueous medium;
   c. estimating a surface area (SA) of surfactant-coated nanoparticles in the aqueous medium based on the average particle length and the average particle diameter estimated in step b. i. and the quantity of the surfactant-coated nanoparticles estimated in step b. ii.;
   d. adjusting a ratio of a quantity of a nanoparticle surface area ($SA_{NP}$) to a quantity of the surfactant to a desired value to form a precursor aqueous solution having a CTAB/$SA_{NP}$ value between 10 to 20;
   e. diluting the precursor aqueous solution with an organic solvent to provide a suspension of surfactant-coated nanoparticles in the organic solvent, and
   f. heating the suspension at about 80-120° C. for about 20 min to 24 hours to remove remaining water.

2. The method of claim 1, wherein the step of adjusting the quantity of the surfactant-coated nanoparticles to the quantity of surfactant comprises:
   separating the surfactant-coated nanoparticles from the surfactant to provide a supernatant component and a solid component;
   decanting a portion of the supernatant component to reduce the quantity of the surfactant to provide a residual mixture; and
   diluting the residual mixture with water to provide the precursor aqueous solution.

3. The method of claim 1, wherein the organic solvent comprises a polar aprotic solvent of boiling point higher than 200° C.

4. The method of claim 3, wherein the polar aprotic solvent is selected from the group consisting of n-methylpyrrolidinone, propylene carbonate, and combinations thereof.

5. The method of claim 1, wherein the heating temperature is about 100° C.

6. The method of claim 1, wherein the heating time is about 20 minutes.

7. The method of claim 1, wherein the nanoparticles comprise gold nanoparticles.

8. The method of claim 1, wherein the step of estimating surface area of the surfactant-coated nanoparticles includes estimating a concentration of the nanoparticles and a concentration of the surfactant in the aqueous medium using ultraviolet-visible spectroscopy.

9. The method of claim 1, further comprising:
   g. diluting an anhydrous nanoparticle dispersion with organic solvents to provide a suspension of surfactant-coated nanoparticles in the organic solvents.

10. The method of claim 9, wherein organic solvent is selected from any polar solvent and combinations thereof.

11. The method of claim 9, wherein organic solvent is selected from the group consisting of toluene, chloroform, cyclohexane, hexane, and combinations thereof.

12. A method for preparing an anhydrous nanoparticle dispersion, comprising the steps of:
   a. providing an aqueous medium comprising a surfactant and a quantity of surfactant-coated nanoparticles suspended in the aqueous medium, wherein the surfactant is cetyltrimethylammonium bromide (CTAB);
   b. i. estimating an average particle length and an average particle diameter of the surfactant-coated nanoparticles suspended in the aqueous medium, and
      ii. estimating a quantity of the surfactant-coated nanoparticles in the aqueous medium;
   c. estimating a surface area (SA) of the surfactant-coated nanoparticles in the aqueous medium based on the average particle length and the average particle diameter estimated in step b. i. and the quantity of the surfactant-coated nanoparticles estimated in step b. ii.;
   d. adjusting a ratio of a quantity of a nanoparticle surface area ($SA_{NP}$) to a quantity of the surfactant to a desired value to form a precursor aqueous solution, wherein the quantity of the surfactant to a quantity of a nanoparticle surface area ($SA_{NP}$) is adjusted to form a precursor aqueous solution having a $CTAB/SA_{NP}$ value between 10 to 20;
   e. diluting the precursor aqueous solution with an organic solvent to provide a suspension of surfactant-coated nanoparticles in the organic solvent,
   f. heating the suspension at about 80-120° C. for about 20 min to 24 hr to remove remaining water and create an anhydrous nanoparticle dispersion; and
   g. diluting the anhydrous nanoparticle dispersion with organic solvents to provide a suspension of surfactant-coated nanoparticles in the organic solvents.

13. The method of claim 12, wherein the step of adjusting the quantity of the surfactant-coated nanoparticles to the quantity of surfactant comprises:
   separating the surfactant-coated nanoparticles from the surfactant to provide a supernatant component and a solid component;
   decanting a portion of the supernatant component to reduce the quantity of the surfactant to provide a residual mixture; and
   diluting the residual mixture with water to provide the precursor aqueous solution.

14. The method of claim 12, wherein the heating temperature is about 100° C., and the heating time is about 20 min.

15. The method of claim 12, wherein the organic solvent is selected from the group consisting of toluene, chloroform, cyclohexane, hexane, and combinations thereof.

* * * * *